United States Patent
Sparks et al.

(10) Patent No.: US 9,446,857 B2
(45) Date of Patent: Sep. 20, 2016

(54) ENGINE COWL AND INLET COVER

(71) Applicant: The Boeing Company, Chicago, IL (US)

(72) Inventors: Rick Earl Sparks, Stanwood, WA (US); Shelby T. Dobbs, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/564,533

(22) Filed: Dec. 9, 2014

(65) Prior Publication Data

US 2015/0089879 A1 Apr. 2, 2015

Related U.S. Application Data

(63) Continuation-in-part of application No. 14/279,527, filed on May 16, 2014, now Pat. No. 8,950,701, which is a continuation-in-part of application No. 14/165,015, filed on Jan. 27, 2014, now abandoned, which is a continuation of application No. 13/368,802, filed on Feb. 8, 2012, now Pat. No. 8,651,415.

(51) Int. Cl.
*B64D 33/02* (2006.01)
*B64F 1/00* (2006.01)

(52) U.S. Cl.
CPC .......... *B64F 1/005* (2013.01); *Y10T 29/49826* (2015.01)

(58) Field of Classification Search
CPC .... B64D 33/02; B64D 25/00; B64C 1/1476; F16B 35/04; F16B 35/06; F16B 35/41; F16B 23/00
See application file for complete search history.

(56) References Cited

U.S. PATENT DOCUMENTS

| | | | |
|---|---|---|---|
| 2,744,382 A | 5/1956 | Sokol et al. | |
| 2,962,184 A | 11/1960 | Meier | |
| 3,000,533 A | 9/1961 | Jodock | |
| 3,194,525 A | 7/1965 | Webb | |
| 3,646,980 A | 3/1972 | Peterson | |
| 3,821,871 A * | 7/1974 | Schmitt | F16B 4/004 29/524.1 |
| 3,828,422 A * | 8/1974 | Schmitt | F16B 4/004 29/524.1 |
| D232,626 S | 9/1974 | Smallwood | |
| 4,760,978 A | 8/1988 | Schuyler et al. | |

(Continued)

OTHER PUBLICATIONS

"More Random Aviation Photos," Aviation Spectator, 18 pages, accessed Jan. 17, 2012, www.aviationspectator.com/more-aviation-photos?page=9.

(Continued)

*Primary Examiner* — Philip J Bonzell
(74) *Attorney, Agent, or Firm* — Yee & Associates, P.C.

(57) ABSTRACT

A method for covering an end of a housing for an engine. A cover is positioned relative to the end of the housing for the engine. The cover comprises a structure, a flange comprised of a deformable material extending from the structure around a circumference of the structure, and a retaining feature configured to extend from a middle portion of the structure such that the retaining feature and the flange form a channel configured to receive the end of the housing. The cover is moved in a direction towards the end of the housing for the engine such that the retaining feature extends into an inlet of the engine through an opening of the housing to form an interference fit between the retaining feature and a portion of an interior surface of the housing.

20 Claims, 25 Drawing Sheets

(56) References Cited

U.S. PATENT DOCUMENTS

| | | | |
|---|---|---|---|
| D303,784 S | 10/1989 | Micallef | |
| 4,874,145 A | 10/1989 | Prentice | |
| 5,114,098 A | 5/1992 | Campbell | |
| 5,660,357 A | 8/1997 | Grossman et al. | |
| 5,919,020 A * | 7/1999 | Walther | F16B 5/0275 411/368 |
| 6,871,819 B2 | 3/2005 | Garric | |
| 7,625,415 B2 | 12/2009 | Durocher et al. | |
| 8,651,415 B1 | 2/2014 | Sparks | |
| 2004/0195437 A1* | 10/2004 | Garric | B64F 1/005 244/53 B |
| 2010/0270427 A1* | 10/2010 | Barrientos | B64D 33/02 244/1 R |
| 2014/0245665 A1 | 9/2014 | Sparks et al. | |
| 2014/0259947 A1 | 9/2014 | Sparks | |

OTHER PUBLICATIONS

"How Can Airplanes Avoid a Bird Strike," Tech Ops Forum, Airliners.net, 9 pages, accessed Jan. 17, 2012, http://www.airliners.net/aviation-forums/tech_ops/read.main/247222/.

Hanssen et al., "A numerical model for bird strike of aluminium foam-based sandwich panels," International Journal of Impact Engineering, vol. 32, Iss. 7, Jul. 2006, pp. 1127-1124.

Office Action, dated Aug. 9, 2013, regarding U.S. Appl. No. 13/368,802, 14 pages.

Notice of Allowance, dated Oct. 22, 2013, regarding U.S. Appl. No. 13/368,802, 9 pages.

Office Action, dated Feb. 27, 2014, regarding U.S. Appl. No. 14/165,015, 15 pages.

Notice of Allowance, dated Oct. 2, 2014, regarding U.S. Appl. No. 14/279,527, 18 pages.

* cited by examiner

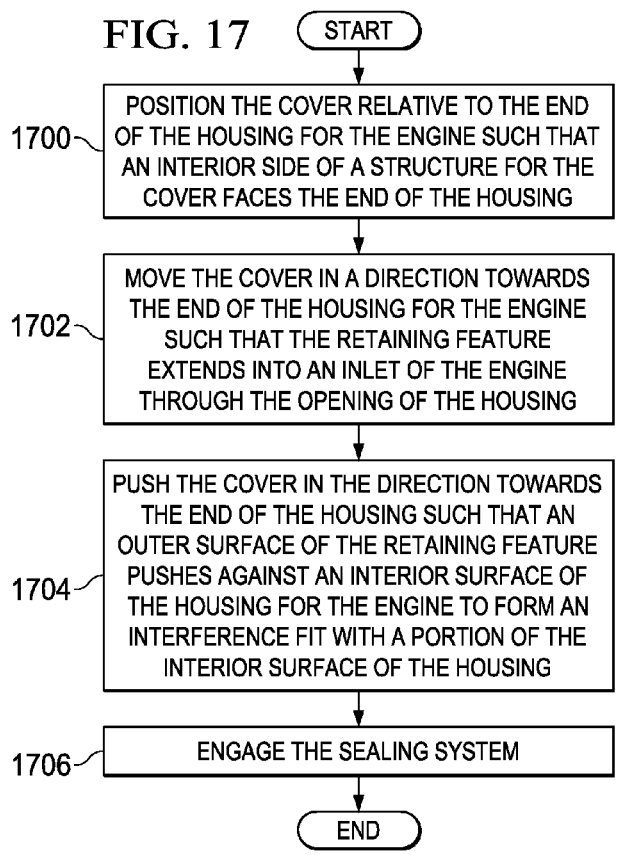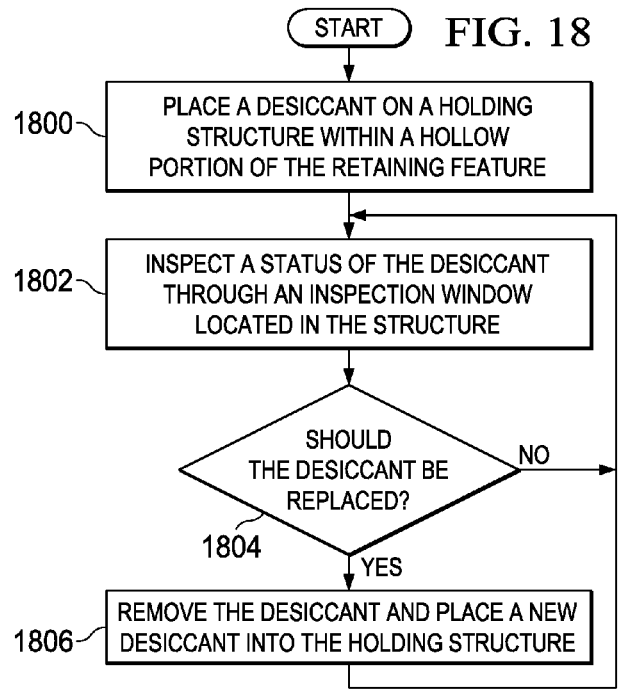

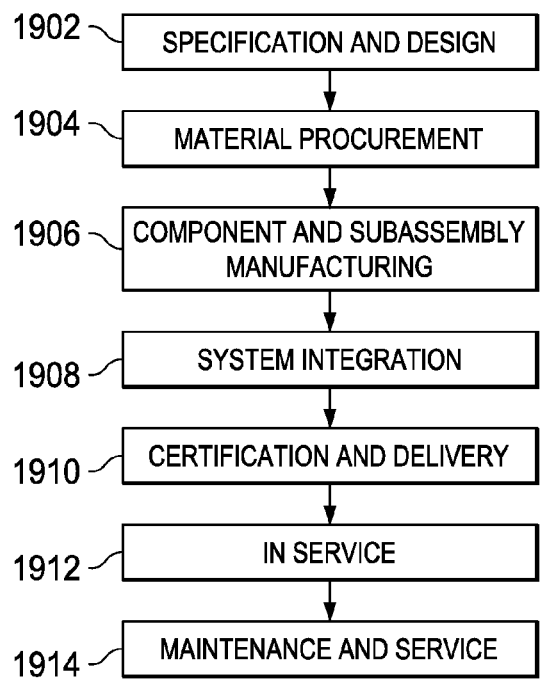
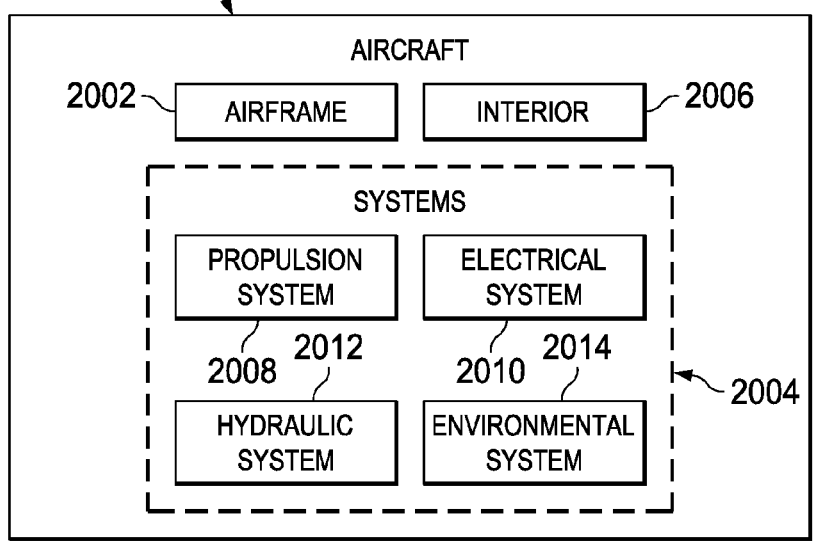

ENGINE COWL AND INLET COVER

CROSS-REFERENCE TO RELATED APPLICATIONS

This application is a continuation-in-part of prior U.S. patent application Ser. No. 14/279,527, filed May 16, 2014, which is a continuation-in-part of prior U.S. patent application Ser. No. 14/165,015, filed Jan. 27, 2014, which is a continuation application of prior U.S. patent application Ser. No. 13/368,802, filed Feb. 8, 2012, issued as U.S. Pat. No. 8,651,415 on Feb. 18, 2014, which are incorporated herein by reference.

BACKGROUND INFORMATION

1. Field

The present disclosure relates generally to aircraft engines and, in particular, to a method and apparatus for protecting the leading edge of a cowl structure and inlet for an aircraft engine.

2. Background

Some currently available aircraft have two or more jet engines mounted to the wings of the aircraft. Turbofans and turbojets are two different types of jet engines that are currently available. Each of these different types of jet engines comprises a housing with an opening at a forward end of the housing. The forward end of the housing is the end of the housing configured to be closest to the nose of the aircraft. The opening at the forward end of the housing allows air to be drawn into the jet engine through an inlet formed by the interior surface of the housing at the forward end of the housing.

Covering this opening into the inlet of a jet engine on an aircraft may be desirable when the aircraft is not in service. For example, covering this opening may be desirable when the aircraft is being stored in a facility, when maintenance is being performed on other parts of the aircraft, when the aircraft is being inspected, during finishing operations, during painting operations, and/or when other operations are being performed on the aircraft.

Further, covering the opening into the inlet of the jet engine may prevent particles, dust, debris, foliage, foreign objects, sand, and/or other undesired items from entering the inlet of the jet engine. The opening of the jet engine may also be covered to protect the inlet from rain, moisture, snow, and/or other weather conditions.

Wind milling may also be prevented by covering the opening into the inlet of the jet engine. Wind milling is the unintended turning of the fan and/or turbine in a jet engine in an aircraft in response to prevailing winds around the aircraft. When an aircraft is stored for long periods of time without a cover for the opening into the inlet of the jet engine, wind milling may cause undesired wear of the jet engine.

Some currently available solutions for covering the opening into the inlet of a jet engine may be covers that comprise plastic materials, fiberglass, and/or other hard materials. These covers may cover the opening into the inlet but may cause undesired inconsistencies to form at the leading edge of the housing. Further, these covers may be unable to protect the leading edge of the housing from inconsistencies caused by, for example, maintenance equipment coming into contact with the leading edge of the housing. Therefore, it would be desirable to have a method and apparatus that take into account at least some of the issues discussed above as well as possible other issues.

SUMMARY

In one illustrative embodiment, an apparatus comprises a structure, a flange, a retaining feature, and a sealing system. The structure is configured to cover an opening of a housing for an engine. The flange is comprised of a deformable material and extends from the structure around a circumference of the structure. The retaining feature is configured to extend as a hollow cylinder into an inlet of the engine through the opening of the housing from a middle portion of the structure, the hollow cylinder being sealed at one end by the structure, such that the retaining feature and the flange form a channel configured to receive an end of the housing and form an interference fit with a portion of an interior surface of the housing. The sealing system is configured to reduce moisture entering the opening of the housing into the inlet of the engine.

In yet another illustrative embodiment, a method for covering an end of a housing for an engine is provided. A cover is positioned relative to the end of the housing for the engine. The cover comprises a structure, a flange comprised of a deformable material extending from the structure around a circumference of the structure, and a retaining feature configured to extend from a middle portion of the structure such that the retaining feature and the flange form a channel configured to receive the end of the housing. The cover is moved in a direction towards the end of the housing for the engine such that the retaining feature extends into an inlet of the engine through an opening of the housing to form an interference fit between the retaining feature and a portion of an interior surface of the housing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 17 is an illustration of a process for covering an end of a housing for an engine in the form of a flowchart in accordance with an illustrative embodiment;

FIG. 18 is an illustration of a process for producing moisture in the form of a flowchart in accordance with an illustrative embodiment;

FIG. 19 is an illustration of an aircraft manufacturing and service method in the form of a block diagram in accordance with an illustrative embodiment; and FIG. 20 is an illustration of an aircraft in the form of a block diagram in which an illustrative embodiment may be implemented;

DETAILED DESCRIPTION

The different illustrative embodiments recognize and take into account different considerations. For example, the different illustrative embodiments recognize and take into account that impact at the forward end of the housing for a jet engine may cause any number of inconsistencies to be formed on the housing. Items, such as, for example, without limitation, maintenance equipment, carts, ladders, rails, racks, and/or other items may impact the forward end of the housing when the jet engine is in storage and/or under maintenance.

One or more of these items impacting the forward end of the housing may cause inconsistencies to be formed at the leading edge of the housing and/or the exterior surface of a cowl structure at the forward end of the housing. These inconsistencies may increase maintenance and/or service costs for the jet engine and/or an aircraft on which the jet engine is mounted more than desired. Consequently, the different illustrative embodiments recognize and take into account that covering the leading edge of the housing for a jet engine on an aircraft in addition to covering the opening into the inlet for the jet engine may be desirable.

The different illustrative embodiments recognize and take into account that some currently available covers for this opening may be unable to cover and/or protect the leading edge of the housing. Further, the different illustrative embodiments also recognize and take into account that some of the currently available covers may be comprised of materials that are hard and may scratch the leading edge of the housing and/or exterior surface of the cowl structure.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

Figure 1:
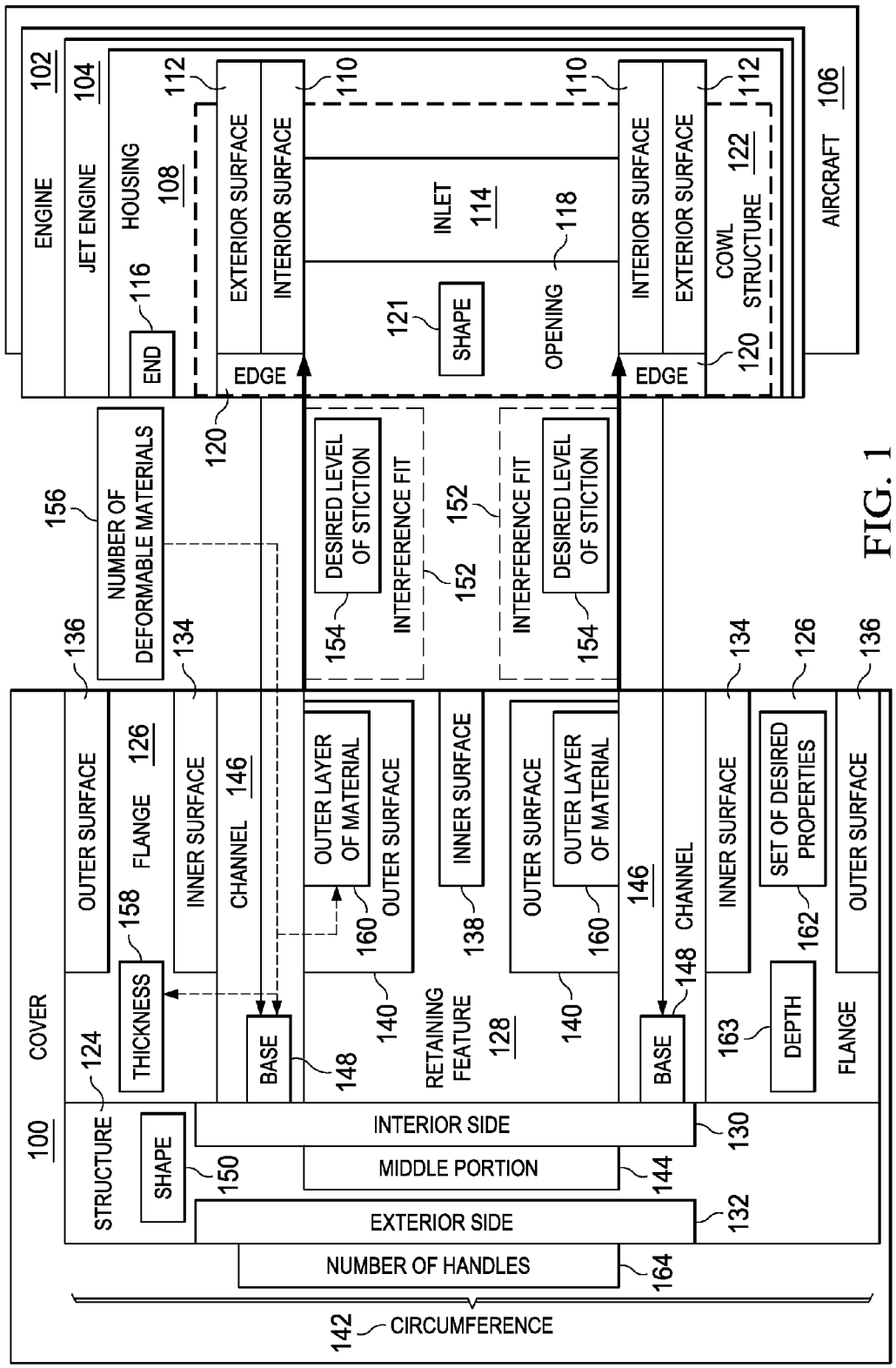
FIG. 1 is an illustration of a cover in the form of a block diagram in accordance with an illustrative embodiment.

With reference now to the figures and, in particular, with reference to FIG. 1, an illustration of a cover in the form of a block diagram is depicted in accordance with an illustrative embodiment. In these illustrative examples, cover 100 may be used as a cover for engine 102.

Engine 102 may take the form of jet engine 104 in these illustrative examples. Jet engine 104 may be, for example, without limitation, a turbofan, a turbojet, a turbine engine, or some other suitable type of engine.

As depicted, jet engine 104 may be mounted to aircraft 106. Aircraft 106 may take the form of, for example, without limitation, an airplane, a jet, an unmanned aerial vehicle, or some other suitable type of aircraft. Of course, in other illustrative examples, jet engine 104 may be for a missile, an automobile, or some other suitable type of vehicle.

As depicted, engine 102 has housing 108. Housing 108 has interior surface 110 and exterior surface 112. A portion of interior surface 110 of housing 108 forms inlet 114 at end 116 of housing 108. End 116 is a forward end of housing 108 in these illustrative examples. In other words, when engine 102 is for aircraft 106, end 116 of housing 108 for engine 102 may be the end closer to the nose of aircraft 106.

Inlet 114 is the space within the hollow portion of housing 108 formed by interior surface 110 through which air may enter into housing 108. In particular, air may enter inlet 114 through opening 118 at end 116 of housing 108. In some cases, inlet 114 may also be referred to as an "air intake".

In these illustrative examples, opening 118 may be defined by edge 120 of housing 108 at end 116. Edge 120 may be referred to as the "leading edge" of housing 108. In particular, edge 120 may be the leading edge for cowl structure 122 of housing 108. Cowl structure 122 may be a particular section of housing 108 located at end 116 of housing 108. Cowl structure 122 may also be referred to as a "cowl" for engine 102.

As depicted, opening 118 may have shape 121. Shape 121 may be any shape formed by a closed curve. In some illustrative examples, shape 121 may be a substantially circular shape. However, in other illustrative examples, the closed curve that forms shape 121 may have one or more portions that are circular, substantially linear, and/or curved in some other manner.

In these illustrative examples, cover 100 may be attached to end 116 of housing 108 to cover opening 118 at end 116 and protect edge 120 of cowl structure 122. As depicted, cover 100 comprises structure 124, flange 126, and retaining feature 128.

Structure 124 has interior side 130 and exterior side 132. Interior side 130 is the side of structure 124 that faces end 116 of housing 108 when cover 100 is attached to end 116 of housing 108. Exterior side 132 is opposite to interior side 130. In these illustrative examples, exterior side 132 of structure 124 is substantially planar. In other words, exterior side 132 is substantially flat.

As depicted, flange 126 has inner surface 134 and outer surface 136. Further, retaining feature 128 has inner surface 138 and outer surface 140. Both flange 126 and retaining feature 128 extend from structure 124 at interior side 130 of structure 124.

In particular, flange 126 extends from structure 124 around circumference 142 of structure 124. Circumference 142 is the outer perimeter of structure 124. In these illustrative examples, flange 126 may extend from structure 124 at an angle perpendicular to interior side 130 of structure 124. However, in other illustrative examples, flange 126 may extend from structure 124 at some other angle with respect to interior side 130 of structure 124. Further, retaining feature 128 extends from middle portion 144 of structure 124.

In these illustrative examples, flange 126 and retaining feature 128 extend from structure 124 in a manner that forms channel 146. Channel 146 is formed by inner surface 134 of flange 126 and outer surface 140 of retaining feature 128. Base 148 of channel 146 is located between inner surface 134 of flange 126 and outer surface 140 of retaining feature 128. Channel 146 is configured to receive edge 120 of cowl structure 122 when cover 100 is attached to end 116 of housing 108.

Attaching cover 100 to end 116 of housing 108 for engine 102 includes positioning cover 100 relative to end 116. In particular, cover 100 may be positioned relative to end 116 such that interior side 130 of structure 124 with flange 126 and retaining feature 128 face end 116.

Structure 124 has shape 150 selected to fully cover opening 118 of housing 108 when cover 100 is positioned relative to end 116. In one illustrative example, shape 150 may be similar to shape 121 of opening 118 of housing 108. In other words, shape 150 of structure 124 may have dimensions substantially equal to the dimensions for shape 121 of opening 118. In other illustrative examples, shape 150 may be larger than shape 121 of opening 118 to ensure that opening 118 is fully covered.

Attaching cover 100 to end 116 of housing 108 further includes moving cover 100 in a direction towards inlet 114 of housing 108 such that retaining feature 128 extends through opening 118 of housing 108 and into inlet 114. Cover 100 may be moved such that retaining feature 128 extends into inlet 114 to form interference fit 152 with a portion of interior surface 110 of housing 108. In particular, interference fit 152 is formed between a portion of interior surface 110 of housing 108 and a portion of outer surface 140 of retaining feature 128.

As used herein, an "interference fit" between two components, such as interference fit 152 between interior surface 110 of housing 108 and outer surface 140 of retaining feature 128, is a fastening of these two components through friction when these components are pushed together.

For example, when retaining feature 128 is moved into inlet 114, outer surface 140 of retaining feature 128 is pushed against interior surface 110 of housing 108. This contact between outer surface 140 of retaining feature 128 and interior surface 110 of housing 108 creates friction. The friction created increases as retaining feature 128 is moved further into inlet 114 until interference fit 152 is formed.

In these illustrative examples, interference fit 152 provides desired level of stiction 154 between interior surface 110 of housing 108 and outer surface 140 of retaining feature 128. "Stiction," as used herein, may be the static friction that needs to be overcome to enable relative motion of stationary objects in contact.

In this manner, desired level of stiction 154 may be a desired level of static friction that needs to be overcome to enable relative motion between cover 100 and end 116 of housing 108. Cover 100 may be considered to be attached to end 116 of housing 108 when interference fit 152 has been formed with desired level of stiction 154.

In these illustrative examples, channel 146 is configured to receive edge 120 of cowl structure 122 when retaining feature 128 is moved into inlet 114. In some cases, edge 120 may come into contact with base 148 of channel 146 when retaining feature 128 is moved into inlet 114 and/or interference fit 152 is formed.

Further, in some illustrative examples, a portion of exterior surface 112 of housing 108 at end 116 may come into contact with inner surface 134 of flange 126 when retaining feature 128 is moved into inlet 114 and/or interference fit 152 is formed. Of course, in other illustrative examples, edge 120 and/or exterior surface 112 of housing 108 may not come into contact with base 148 of channel 146 and/or inner surface 134 of flange 126 when interference fit 152 is being formed. In particular, contact between interior surface 110 of housing 108 and outer surface 140 of retaining feature 128 may be the only contact formed between engine 102 and cover 100 in some illustrative examples.

Flange 126, retaining feature 128, and base 148 of channel 146 may be comprised of any number of materials. These materials may be selected to reduce a possibility of a number of inconsistencies being formed at edge 120 of cowl structure 122, on exterior surface 112 of cowl structure 122, and/or on interior surface 110 of cowl structure 122 when retaining feature 128 is moved into inlet 114 and interference fit 152 is being formed. As used herein, a "number of," when used with reference to items, means one or more items. For example, a number of inconsistencies means one or more inconsistencies.

Further, flange 126 may be comprised of a deformable material selected from at least one of number of deformable materials 156. A deformable material in number of deformable materials 156 may be any material configured to be flexible and/or capable of being shaped. Further, a deformable material in number of deformable materials 156 may be a material that does not cause inconsistencies outside of selected tolerances to form on a surface when the surface is in contact with the material.

Number of deformable materials 156 may include at least one of, for example, without limitation, a foam material, a polyurethane material, an elastomer, a polymer, a shape memory polymer, a syntactic foam material, an integral skin foam material, an aerogel, or some other suitable types of deformable material. In one illustrative example, flange 126 may be comprised of a foam material selected from number of deformable materials 156.

Depending on the implementation, this foam material may comprise at least one of an open-cell foam material, a closed-cell foam material, a shape memory polymer, a composite material, or some other suitable type of material. Of course, in other illustrative examples, flange 126 may be comprised of one or more other deformable materials selected from number of deformable materials 156 in addition to and/or in place of a foam material.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Further, one or more deformable materials selected from number of deformable materials 156 may be added to base 148 of channel 146. In this manner, a possibility of inconsistencies being formed at edge 120 of cowl structure 122 when edge 120 comes into contact with base 148 may be reduced.

In these illustrative examples, retaining feature 128 may be comprised of various materials. Retaining feature 128 may be comprised of any number of materials configured to give retaining feature 128 a selected level of rigidity. In this manner, retaining feature 128 may not change shape or bend outside of selected tolerances when retaining feature 128 is moved into inlet 114 to form interference fit 152.

Retaining feature 128 may be comprised of, for example, without limitation, at least one of a rubber material, a silicone material, an elastomer, a foam material, a rubberized foam material, a honeycomb material, or other suitable types of materials. Additionally, in some illustrative examples, at least a portion of outer surface 140 of retaining feature 128 may be formed by outer layer of material 160. Outer layer of material 160 may form at least the portion of outer surface 140 of retaining feature 128 that forms interference fit 152 with interior surface 110 of housing 108.

Outer layer of material 160 may be selected to reduce a possibility of inconsistencies being formed on interior surface 110 of housing 108 when retaining feature 128 is moved into inlet 114 to form interference fit 152. In one illustrative example, outer layer of material 160 may comprise one or more deformable materials selected from number of deformable materials 156. Outer layer of material 160 of retaining feature 128 may have a smaller thickness than thickness 158 of flange 126 in some cases.

In these illustrative examples, the one or more deformable materials selected from number of deformable materials 156 for flange 126 and thickness 158 for flange 126 may be selected such that flange 126 has set of desired properties 162. Set of desired properties 162 may include at least one of a desired level of thermal resistance, a desired flexibility, a desired weight, a capability of absorbing kinetic energy, a capability of being easily cleaned, and other suitable properties.

As one illustrative example, thickness 158 for flange 126 may be selected to reduce a possibility of one or more inconsistencies being formed on exterior surface 112 of housing 108 when kinetic energy is applied to flange 126. Kinetic energy may be applied to flange 126 when, for example, an object impacts flange 126. Thickness 158 may be selected such that at least a portion of the kinetic energy applied to flange 126 is absorbed. Further, the deformable material selected for flange 126 may be configured to absorb the kinetic energy applied to flange 126.

Additionally, depth 163 for flange 126 may be selected such that flange 126 extends over a portion of exterior surface 112 of housing 108 by a desired amount when cover 100 is attached to end 116 of housing 108. Flange 126 may cover and protect this portion of exterior surface 112 from, for example, without limitation, impact by a foreign object.

In these depicted examples, structure 124 may be comprised of any number of materials configured to give structure 124 a selected level of rigidity and strength. For example, without limitation, structure 124 may be comprised of at least one of wood, plastic, metal, a metal alloy, a composite material, fiberglass, a resin-filled fiber, a honeycomb sandwich panel, a metal honeycomb and resin-reinforced fiber panel, or other suitable types of materials.

In these illustrative examples, cover 100 may have number of handles 164 attached to exterior side 132 of structure 124. Number of handles 164 may be used to attach cover 100 to end 116 of housing 108, remove cover 100 from end 116 of housing 108, transport cover 100, store cover 100, position cover 100, and/or handle cover 100 in some other suitable manner.

Thus, the different illustrative embodiments provide a cover for an inlet of an engine that also protects a leading edge of the housing for the engine. Cover 100 may be used to cover opening 118 into inlet 114 and protect edge 120 of cowl structure 122 in a number of different situations.

These situations may include, for example, without limitation, when engine 102 is in storage, when operations are being performed on engine 102, when engine 102 is being visually inspected, when painting operations are being performed on engine 102, and/or other suitable situations. Further, cover 100 may be attached to end 116 of housing 108 when engine 102 is mounted on aircraft 106 and/or when engine 102 is not mounted on aircraft 106. When engine 102 is mounted on aircraft 106, cover 100 may be used when aircraft 106 is being manufactured, is not in use, is in storage, or is under maintenance.

The illustration of cover 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, cover 100 may include features in addition to structure 124, flange 126, and retaining feature 128. In some illustrative examples, retaining feature 128, flange 126, and/or structure 124 may be coated with a material in addition to the materials for these features described above. The coating may be, for example, without limitation, a silicone coating, a protective coating, a liquid repellant coating, or some other suitable type of coating.

In other illustrative examples, additional layers of material may be placed on cover 100 when using cover 100 during certain operations. For example, without limitation, when cover 100 is used to protect inlet 114 and edge 120 of cowl structure 122 during painting operations, a layer of material may be placed around outer surface 136 of flange 126. Masking tape used during painting operations may be attached to this layer of material instead of outer surface 136 of flange 126 to protect inconsistencies from forming on outer surface 136 of flange 126 as a result of the masking tape.

Referring now to FIGS. 2-9, illustrations of an example of one implementation for a cover for an inlet of an engine are depicted in accordance with an illustrative embodiment. In FIGS. 2-9, cover 200 is an example of one implementation for cover 100 in FIG. 1.

Figure 2:
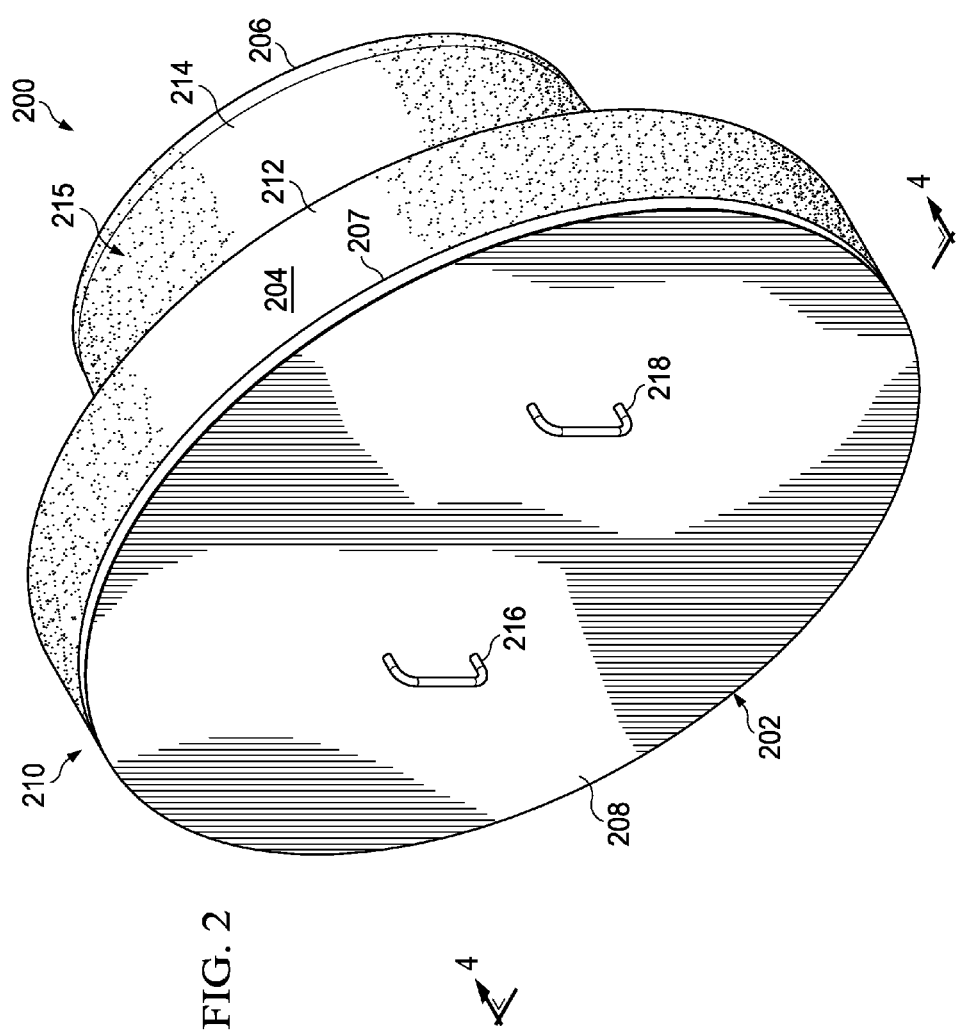
FIG. 2 is an illustration of a perspective view of a cover in accordance with an illustrative embodiment.

With reference now to FIG. 2, an illustration of a perspective view of cover 200 is depicted in accordance with an illustrative embodiment. In this illustrative example, cover 200 comprises structure 202, flange 204, and retaining feature 206. Structure 202, flange 204, and retaining feature 206 are examples of implementations for structure 124, flange 126, and retaining feature 128, respectively, in FIG. 1.

Structure 202 has interior side 207 and exterior side 208. Exterior side 208 of structure 202 is substantially planar in this illustrative example. In other words, exterior side 208 is substantially flat.

In this depicted example, flange 204 extends from structure 202 at interior side 207 of structure 202. In particular, flange 204 extends from structure 202 around circumference 210 of structure 202. Flange 204 has an inner surface (not seen in this view) and outer surface 212. Further, retaining feature 206 extends from a middle portion of structure 202 at interior side 207 of structure 202. Retaining feature 206 has an inner surface (not seen in this view) and outer surface 214. Outer layer of material 215 is present at outer surface 214.

Additionally, as depicted, cover 200 has handle 216 and handle 218. Handle 216 and handle 218 may be used to position cover 200, transport cover 200, move cover 200, attach cover 200 to the end of a housing for an engine, store cover 200, and/or handle cover 200 in some other suitable manner.

Figure 3:
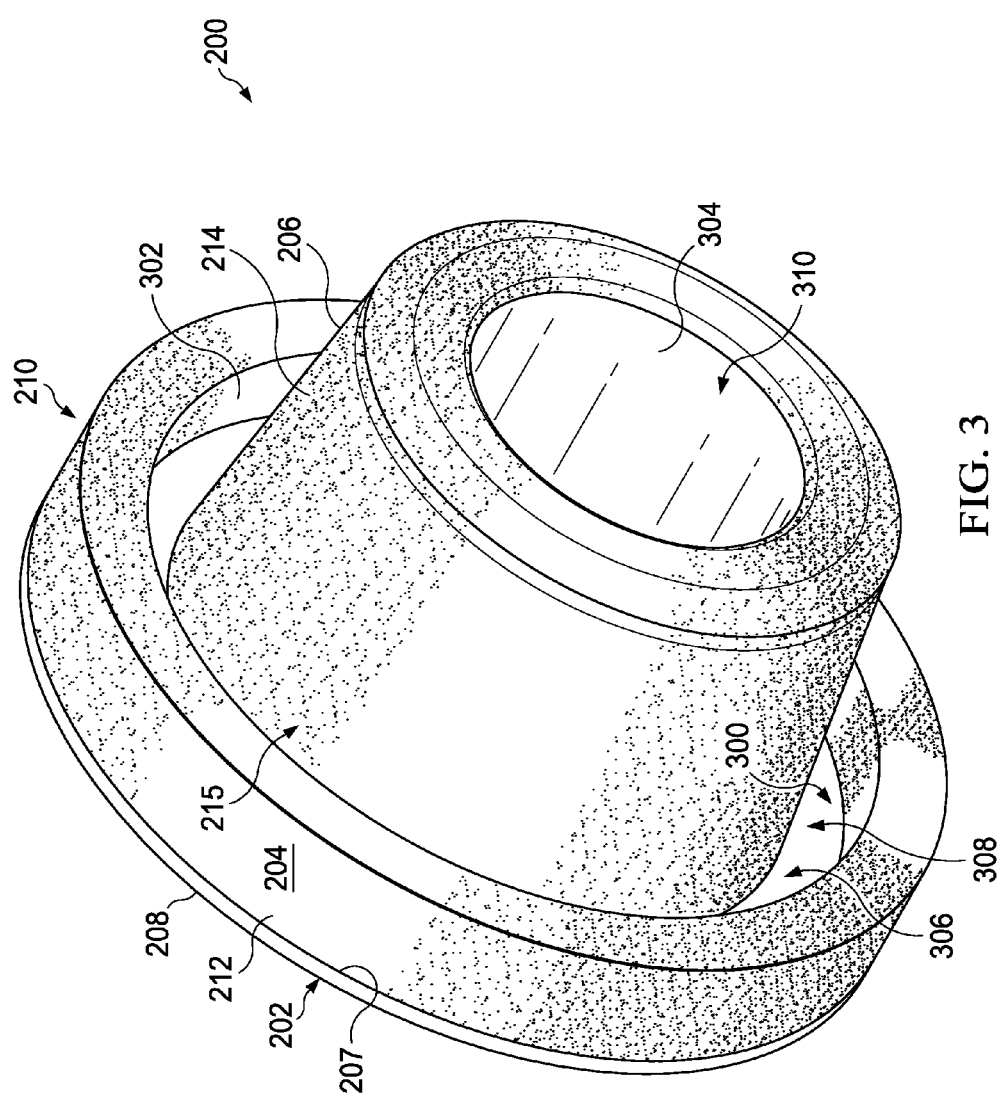
FIG. 3 is an illustration of another perspective view of a cover in accordance with an illustrative embodiment.

With reference now to FIG. 3, an illustration of another perspective view of cover 200 is depicted in accordance with an illustrative embodiment. In this illustrative example, flange 204 and retaining feature 206 are seen extending from interior side 207 of structure 202. Further, inner surface 302 of flange 204 and inner surface 304 of retaining feature 206 are seen.

In this illustrative example, flange 204 and retaining feature 206 extend from structure 202 at interior side 207 of structure 202 in a manner that forms channel 306. Channel 306 may have base 308 located at interior side 207 of structure 202. Channel 306 may be configured to receive a leading edge of a cowl structure for a housing for an engine.

As depicted, inner surface 304 of retaining feature 206 forms hollow portion 310 in retaining feature 206. Hollow portion 310 may be configured to reduce the amount of material needed for retaining feature 206. In this manner, hollow portion 310 may reduce a weight and/or cost for retaining feature 206 as compared to hollow portion 310 being filled.

In this illustrative example, flange 204, retaining feature 206, and base 308 of channel 306 may comprise materials configured to reduce a possibility of inconsistencies being formed at the forward end of the housing for an engine when cover 200 is attached to the forward end of the housing. For example, flange 204 may be comprised of a deformable material, such as, for example, a memory foam material. Further, the memory foam material may also be added to base 308 of channel 306.

As depicted, retaining feature 206 may have outer layer of material 215 at outer surface 214 of retaining feature 206. Outer layer of material 215 may also be comprised of a memory foam material in this depicted example. Other portions of retaining feature 206 may be comprised of a material selected to give retaining feature 206 a selected level of rigidity.

Figure 4:
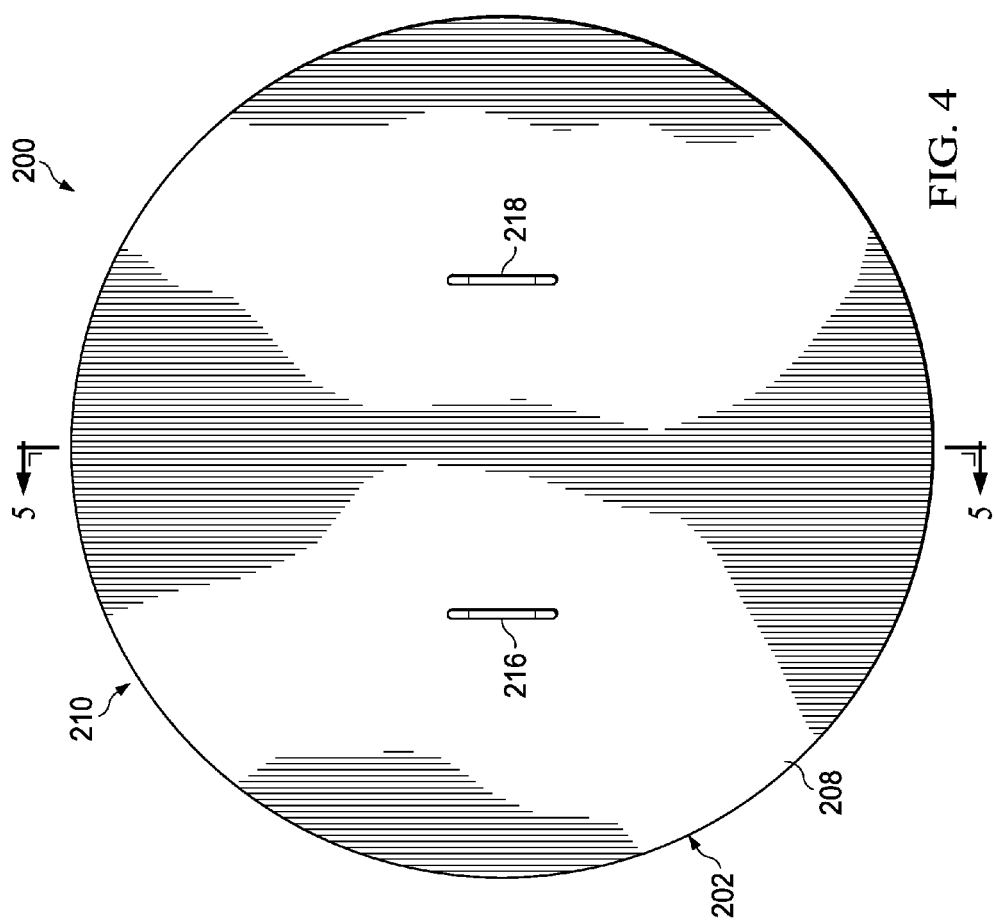
FIG. 4 is an illustration of a top view of a cover in accordance with an illustrative embodiment.

With reference now to FIG. 4, an illustration of a top view of cover 200 is depicted in accordance with an illustrative embodiment. In this illustrative example, a top view of cover 200 taken along lines 4-4 in FIG. 2 is depicted.

Figure 5:
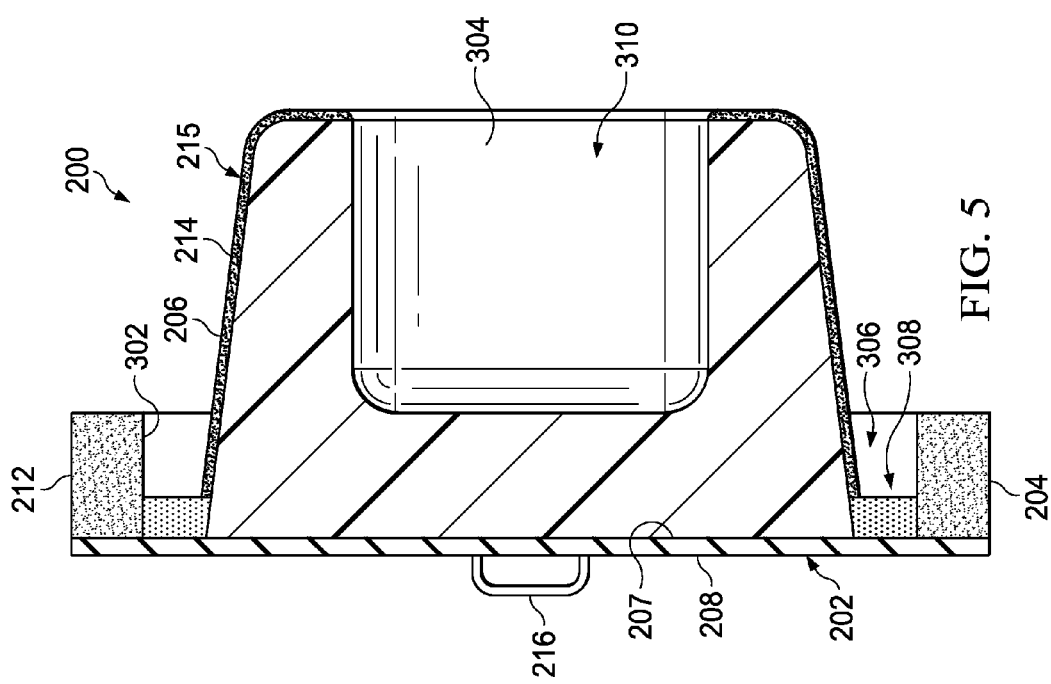
FIG. 5 is an illustration of a cross-sectional view of a cover in accordance with an illustrative embodiment.

Turning now to FIG. 5, an illustration of a cross-sectional view of cover 200 is depicted in accordance with an illustrative embodiment. In this illustrative example, a cross-sectional view of cover 200 taken along lines 5-5 in FIG. 4 is depicted. This cross-sectional view provides a clearer view of channel 306.

Figure 6:
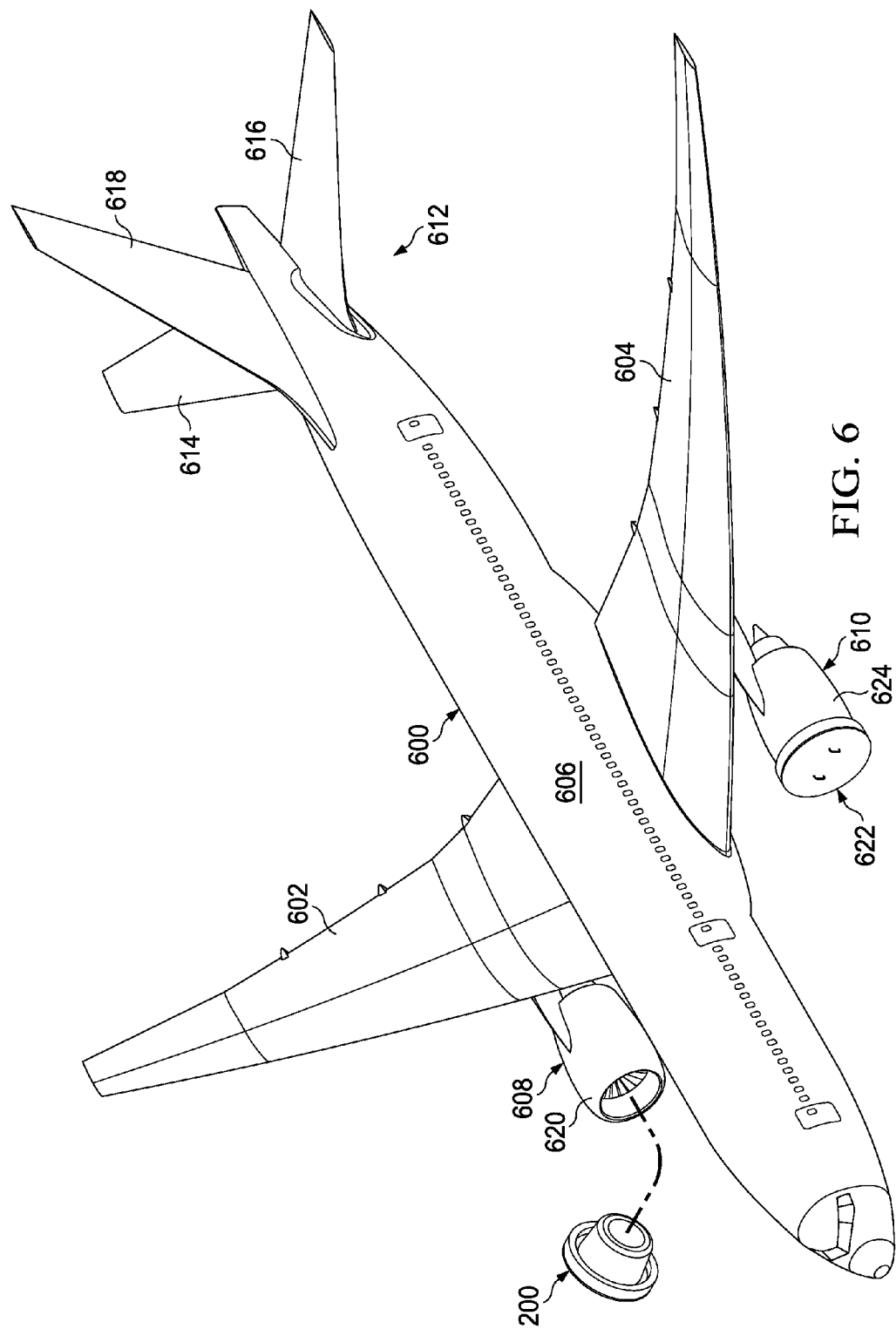
FIG. 6 is an illustration of an aircraft with a cover attached to an engine of the aircraft in accordance with an illustrative embodiment.

With reference now to FIG. 6, an illustration of an aircraft with cover 200 attached to an engine of the aircraft is depicted in accordance with an illustrative embodiment. In this illustrative example, aircraft 600 is an example of one implementation for aircraft 106 in FIG. 1. Aircraft 600 has wing 602 and wing 604 attached to body 606.

Aircraft 600 includes engine 608 attached to wing 602 and engine 610 attached to wing 604. Engine 608 and engine 610 may be examples of one implementation for engine 102 in FIG. 1. Body 606 of aircraft 600 has tail section 612. Horizontal stabilizer 614, horizontal stabilizer 616, and vertical stabilizer 618 are attached to tail section 612 of body 606.

As depicted, cover 200 from FIGS. 2-5 may be positioned relative to housing 620 for engine 608 for attachment to housing 620. In this illustrative example, cover 622 has already been attached to housing 624 for engine 610. Cover 622 may be implemented in a manner similar to cover 200 in FIGS. 2-5.

Figure 7:
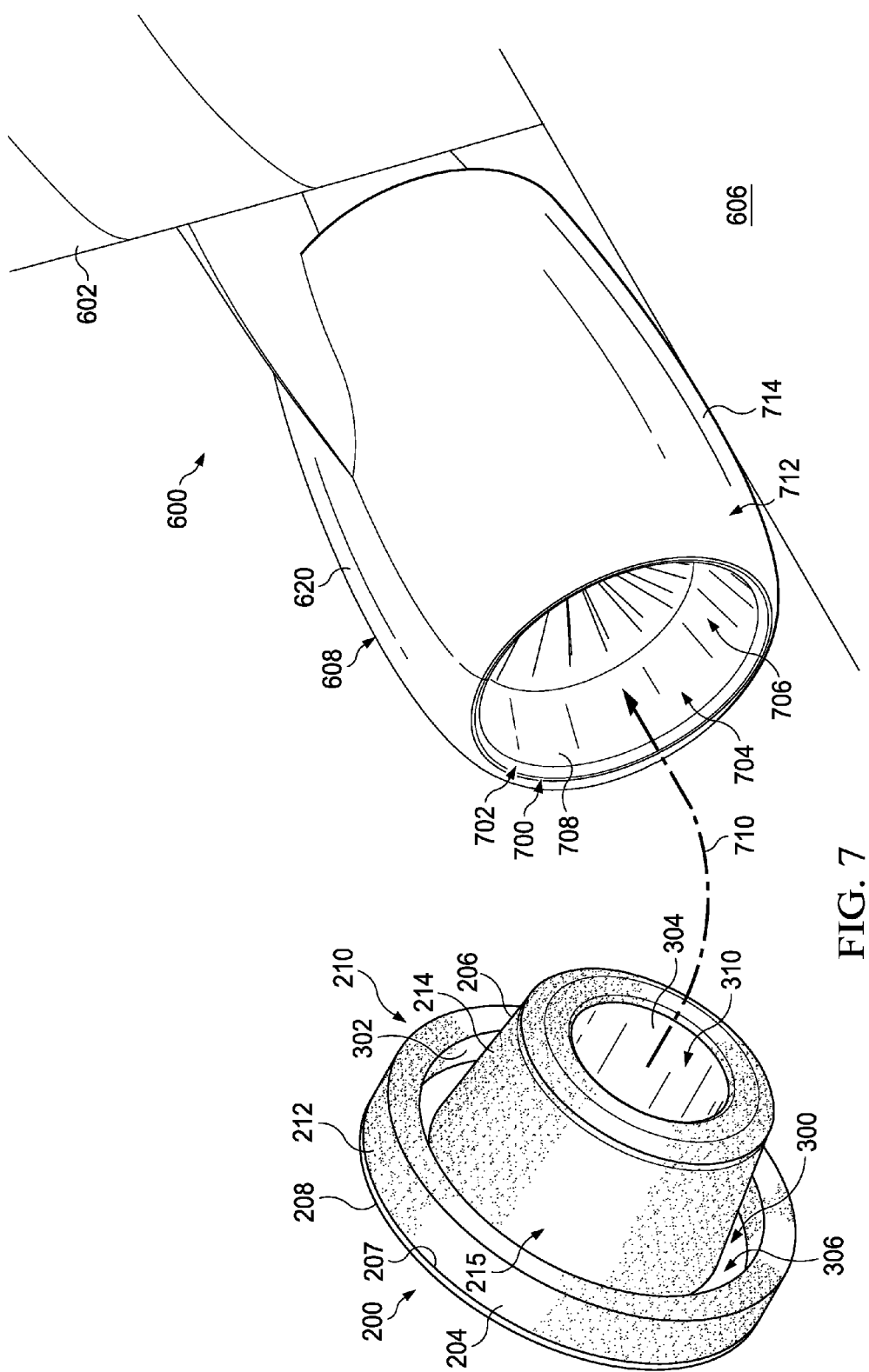
FIG. 7 is an illustration of a cover positioned near an engine in accordance with an illustrative embodiment.

With reference now to FIG. 7, an illustration of cover 200 positioned near engine 608 is depicted in accordance with an illustrative embodiment. As depicted, cover 200 may be configured for attachment to end 700 of housing 620 of engine 608.

Housing 620 has leading edge 702 at end 700 of housing 620. Leading edge 702 defines opening 704. Opening 704 may be an opening into inlet 706 for engine 608. Inlet 706 may be formed by interior surface 708 of housing 620.

In this illustrative example, cover 200 may be moved towards housing 620 in the direction of arrow 710 to attach cover 200 to end 700 of housing 620. When cover 200 is moved towards inlet 706, retaining feature 206 of cover 200 moves through opening 704 and extends into inlet 706. Outer surface 214 of retaining feature 206 may form an interference fit with interior surface 708 of housing 620.

Further, as retaining feature 206 is moved into inlet 706, channel 306 may receive leading edge 702 of housing 620. In this illustrative example, leading edge 702 is the leading edge of cowl structure 712 of housing 620.

When retaining feature 206 has been pushed into inlet 706 far enough in the direction of arrow 710 such that an interference fit is formed, flange 204 may extend over a portion of exterior surface 714 of housing 620 at end 700 of housing 620 to cover this portion of exterior surface 714. In this manner, cover 200 may be attached to end 700 of housing 620 for engine 608 to cover opening 704 into inlet 706 and protect leading edge 702 of cowl structure 712 of housing 620.

Figure 8:
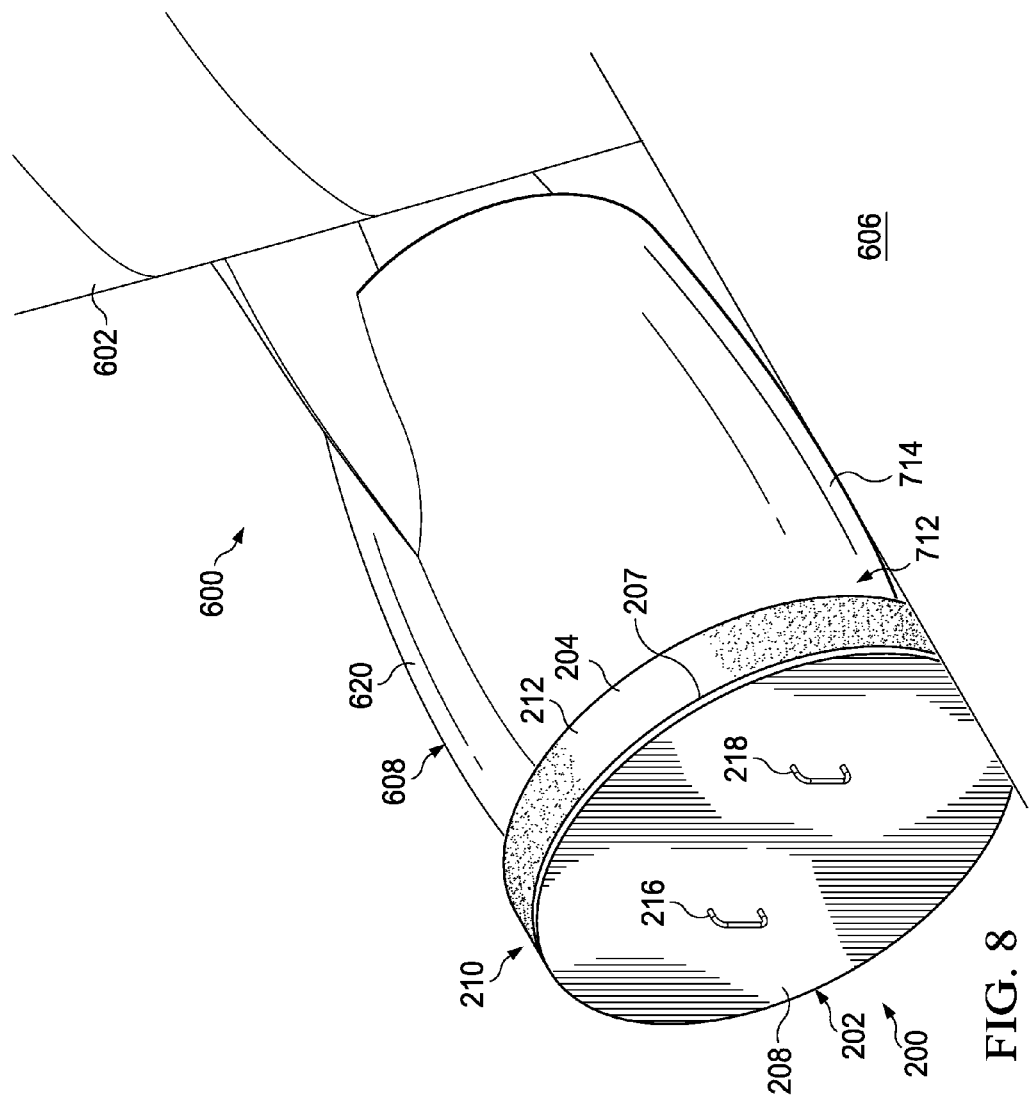
FIG. 8 is an illustration of a cover attached to an engine in accordance with an illustrative embodiment.

Turning now to FIG. 8, an illustration of cover 200 attached to engine 608 is depicted in accordance with an illustrative embodiment. In this illustrative example, cover 200 has been attached to end 700 in FIG. 7 of housing 620. As depicted, opening 704 into inlet 706 of engine 608 in FIG. 7 has been covered by cover 200. Further, leading edge 702 of cowl structure 712 of housing 620 in FIG. 7 has been covered.

Figure 9:
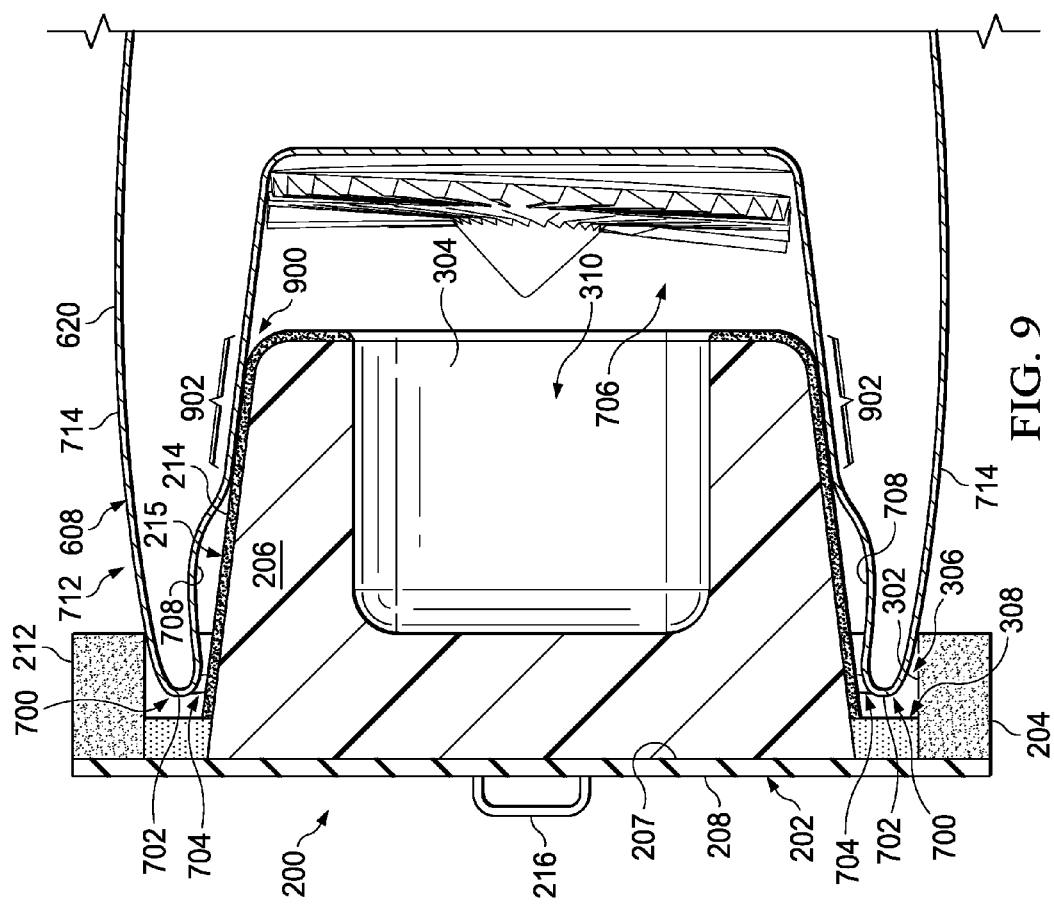
FIG. 9 is an illustration of a cross-sectional view of a cover attached to an engine in accordance with an illustrative embodiment.

With reference now to FIG. 9, an illustration of a cross-sectional view of cover 200 attached to engine 608 is depicted in accordance with an illustrative embodiment. As depicted, cover 200 has been attached to end 700 of housing 620 to form interference fit 900. Interference fit 900 is formed by portion 902 of interior surface 708 of housing 620 and outer layer of material 215 at outer surface 214 of retaining feature 206.

In this illustrative example, leading edge 702 at end 700 may not come into contact with base 308 of channel 306 when interference fit 900 is formed. Further, as depicted, exterior surface 714 of housing 620 may not come into contact with inner surface 302 of flange 204 when interference fit 900 is formed.

The illustrations of cover 200 in FIGS. 2-9 are not meant to imply physical or architectural limitations to the manner in which an illustrative embodiment may be implemented. Other components in addition to or in place of the ones illustrated may be used. Some components may be unnecessary.

For example, in some illustrative examples, a portion of inner surface 302 may come into contact with exterior surface 714 of housing 620 when interference fit 900 is formed. In other illustrative examples, leading edge 702 may come into contact with base 308 of channel 306 when interference fit 900 is formed.

Further, the different components shown in FIGS. 2-9 may be combined with components in FIG. 1, used with components in FIG. 1, or a combination of the two. Additionally, some of the components in FIGS. 2-9 may be illustrative examples of how components shown in block form in FIG. 1 can be implemented as physical structures. Of course, in other illustrative examples, the components shown in block from in FIG. 1 may be implemented using other physical structures than the physical structures shown in FIGS. 2-9.

The illustrative embodiments also recognize and take into account that in some cases, an aircraft may be stored or parked outside and exposed to the environment. For example, exposure to rain may result in undesired amounts of moisture being on the inlet or other parts of the engine of an aircraft. The illustrative embodiments also recognize and take into account that in other cases, an aircraft may be located in a structure that may not be climate controlled. As a result, the aircraft may be exposed to conditions that may cause moisture to form on the different parts of the aircraft, including the engine inlet or other parts of the engine where moisture is undesirable.

The moisture may cause inconsistencies to form or spread. For example, an inconsistency such as discoloration of the metal on the inlet may result. The discoloration may be aesthetically unappealing and expensive to remove.

Thus, the illustrative embodiments also provide a method and apparatus for covering an opening in an engine housing that reduces concerns about moisture. In one illustrative example, an apparatus comprises a structure, a flange, a retaining feature, and a sealing system. The structure is configured to cover an opening of a housing for an engine. The flange is comprised of a deformable material and configured to extend from the structure around a circumference of the structure. The retaining feature is configured to extend, substantially as a hollowed cylinder into an inlet of the engine through the opening of the housing from a middle portion of the structure, the hollowed cylinder being sealed at one end by the structure, such that the retaining feature and the flange form a channel configured to receive an end of the housing and form an interference fit with a portion of an interior surface of the housing. The sealing system is configured to reduce moisture entering the opening of the housing into the inlet of the engine.

Figure 10:
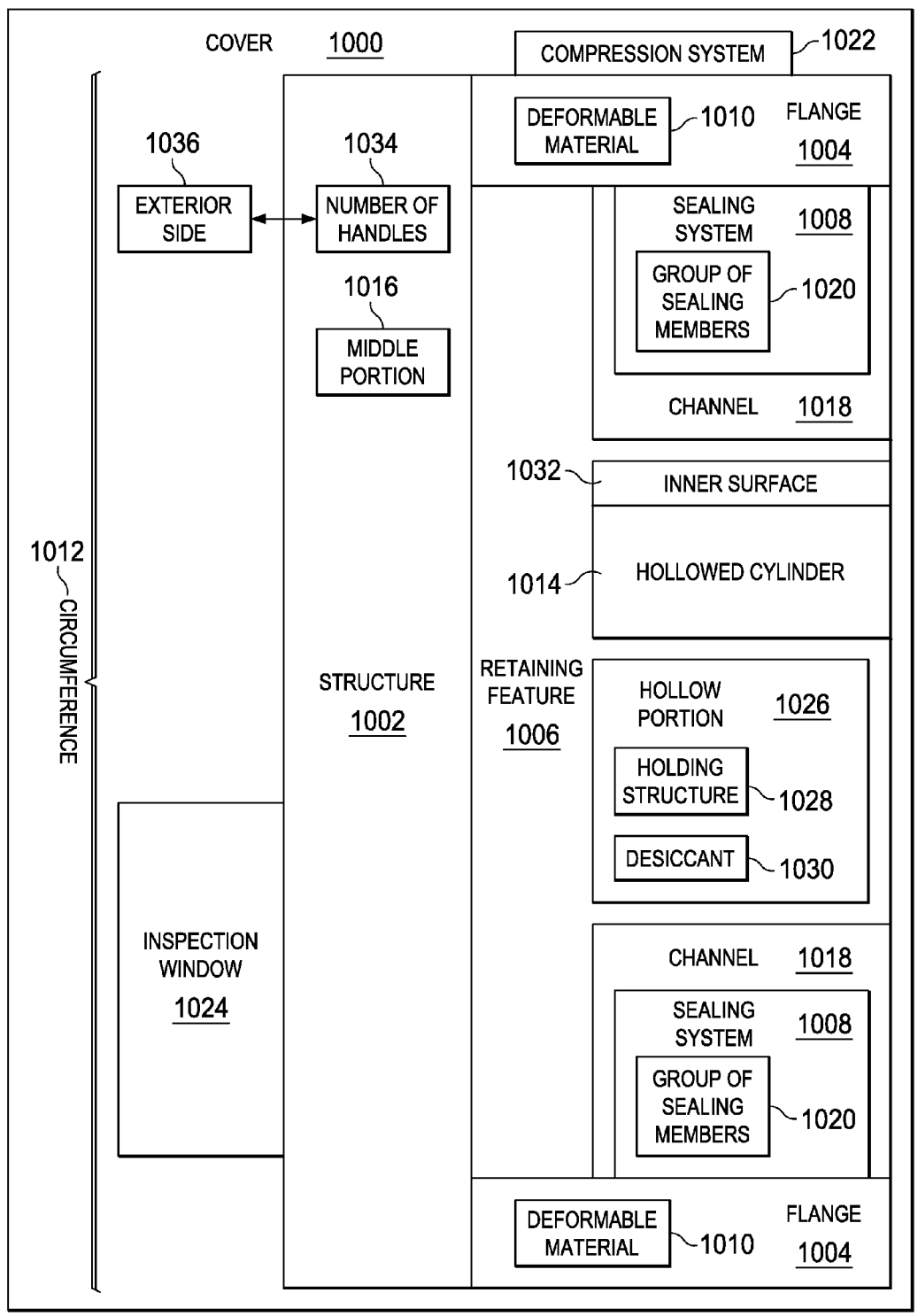
FIG. 10 is an illustration of a cover with additional moisture reduction features in the form of a block diagram in accordance with an illustrative embodiment.

With reference next to FIG. 10, an illustration of a cover with additional moisture reduction features in the form of a block diagram is depicted in accordance with an illustrative embodiment. In this illustrative example, cover 1000 also may be used as a cover for engine 102 in FIG. 1. As depicted, cover 1000 may include one or more features from cover 100 in FIG. 1 in addition to the ones illustrated in this figure. All the features from cover 100 that may be used in cover 1000 are not depicted with respect to cover 1000, to avoid obscuring additional features for this illustrative example.

In this example, cover 1000 includes a number of different components. As depicted, cover 1000 includes structure 1002, flange 1004, retaining feature 1006, and sealing system 1008.

Structure 1002 is configured to cover opening 118 of engine 102 in FIG. 1. In particular, structure 1002 has a shape selected to fully cover opening 118 of housing 108 for engine 102 in FIG. 1.

In this illustrative example, flange 1004 extends from structure 1002. Flange 1004 is comprised of deformable material 1010 and configured to extend from structure 1002 around circumference 1012 of structure 1002. In this illustrative example, deformable material 1010 is comprised of material selected from one of a foam material, a polyurethane material, an elastomer, a polymer, a shape memory polymer, a syntactic foam material, an integral skin foam material, an aerogel, or other suitable types of materials.

In this example, retaining feature 1006 is configured to extend substantially as hollowed cylinder 1014 into inlet 114 of engine 102 in FIG. 1 through the opening 118 of housing 108 in FIG. 1, from middle portion 1016 of structure 1002. In this example, hollowed cylinder 1014 is sealed at one end by structure 1002. Retaining feature 1006 and flange 1004 form channel 1018 configured to receive an end of housing 108 and form an interference fit with a portion of interior surface 110 of housing 108 in FIG. 1.

As depicted, sealing system 1008 is part of cover 1000. Sealing system 1008 is configured to reduce moisture entering opening 118 of housing 108 into inlet 114 of engine 102 in FIG. 1. In one illustrative example, sealing system 1008 is comprised of group of sealing members 1020. "A group of," as used herein with reference to an item means one or more items. For example group of sealing members 1020 is one or more sealing members.

Group of sealing members 1020 may be comprised of a number of different types of sealing members. For example, group of sealing members 1020 may include at least one of an o-ring, a bulb seal, an adhesive strip, a sealant, or some other suitable sealant.

Cover 1000 also may include compression system 1022. As depicted, compression system 1022 is configured to compress group of sealing members 1020 against housing 108 in FIG. 1. In other words, compression system 1022 applies a force against group of sealing members 1020. The force may be such that group of sealing members are compressed against housing 108 in FIG. 1.

Additionally, cover 1000 may include inspection window 1024. In these illustrative examples, inspection window 1024 allows an operator to see into cover 1000. In particular, inspection window 1024 provides a view of hollow portion 1026 of retaining feature 1006 in cover 1000. The view provided using inspection window 1024 may also be configured to allow for inspection of engine 102, such as inlet 114 in engine 102 in FIG. 1. As depicted, inspection window 1024 may be comprised of a substantially transparent material selected from one of glass, smart glass, a transparent ceramic, polycarbonate, a plastic, and other suitable materials.

In the illustrative example, cover 1000 also may include holding structure 1028 that is configured to hold desiccant 1030 within hollow portion 1026 of retaining feature 1006. In this illustrative example, desiccant 1030 is a material that absorbs moisture that may be present in the air. Desiccant 1030 may reduce humidity in the vicinity of the desiccant 1030. For example, desiccant 1030 may be a hygroscopic material that induces or sustains a state of dryness in its vicinity.

In this example, inner surface 1032 of retaining feature 1006 forms hollow portion 1026 in retaining feature 1006. As depicted, inspection window 1024 may be used to view desiccant 1030 within hollow portion 1026 of retaining feature 1006 when held in holding structure 1028.

Further, cover 1000 also may have number of handles 1034. As used herein, a "number" when used with reference to items means one or more items. For example number of handles 1034 is one or more handles. In this illustrative example, number of handles 1034 is attached to exterior side 1036 of structure 1028. Number of handles 1034 may be used to move cover 1000, install cover 1000 in engine 102, remove cover 1000 from engine 102, or perform other operations on cover 1000.

The illustration of cover 1000 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, compression system 1022 may be unnecessary depending on the design and shape of different components in cover 1000. The installation of cover 1000 may provide a desired level of sealing from moisture by sealing system 1008 without requiring additional actions to engage sealing system 1008 with housing 108 for engine 102 in FIG. 1. In another illustrative example, number of handles 1034 may be omitted depending on the particular implementation. Further, in some illustrative examples, the different components in cover 1000 separate from each other for purposes of storage for transportation. For example, structure 1002 may be removably associated with flange 1004. In still other illustrative examples, structure 1002 may be comprised of multiple parts that may be connected to each other to install cover 1000.

Figure 11:
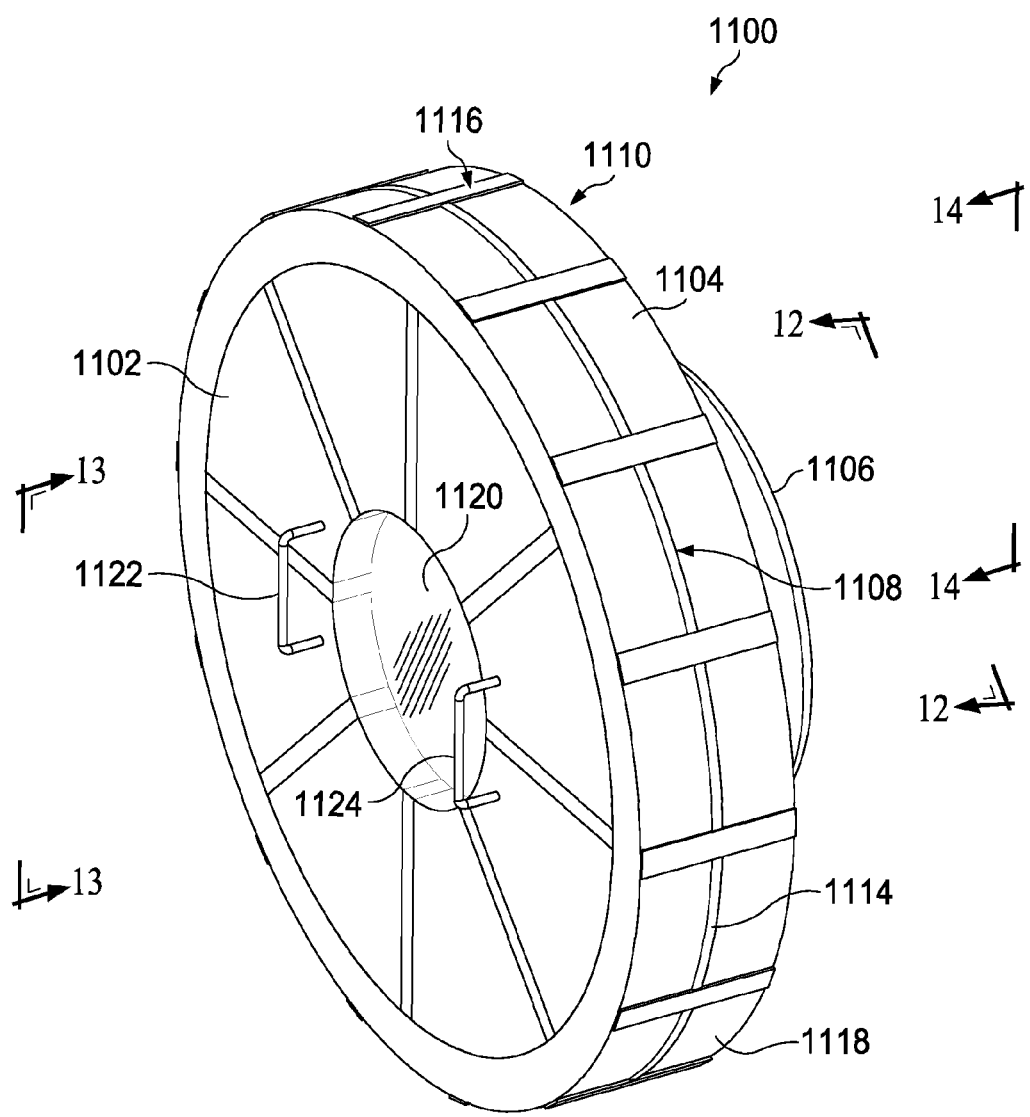
FIG. 11 is an illustration of a perspective view of a cover in accordance with an illustrative embodiment.

Turning to FIG. 11, an illustration of a perspective view of cover 1000 is depicted in accordance with an illustrative embodiment. In this example, cover 1100 comprises structure 1102, flange 1104, retaining feature 1106, and sealing system 1108. Structure 1102, flange 1104, retaining feature 1106, and sealing system 1108 are examples of physical implementations for structure 1002, flange 1004, retaining feature 1006, and sealing system 1008, respectively, shown in block form in FIG. 10.

In this depicted example, structure 1102 is configured to cover an opening of a housing for an engine. Flange 1104 is physically associated with structure 1102. Flange 1104 extends from structure 1102 around circumference 1110 of structure 1102.

When one component is "physically associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

Retaining feature 1106 is physically associated with structure 1102 and also extends from structure 1102. Retaining feature 1106 is designed to cause an interference fit with an interior portion of an engine when cover 1100 is installed.

As depicted, retaining feature 1106 has a shape of a cylinder. In particular, the shape may be a hollowed cylinder that may taper. Retaining feature 1106 extends into an inlet of an engine through an opening of the housing of an engine when cover 1100 is installed on the engine.

In the illustrative examples, sealing system 1108 is configured to reduce moisture that may occur on a portion of the engine, such as an inlet. As depicted, strap 1114 is part of sealing system 1108. Strap 1114 is used to compress or push a sealing member (not shown) against the housing of the engine. The compression provides increased sealing against moisture in this depicted example. In this manner, strap 1114 may be used to cause sealing system 1108 to have a desired amount of engagement with exterior surface 112 of housing 108 for engine 102 in FIG. 1 to seal against moisture.

In this illustrative example, retainers 1116 hold strap 1114 on cover 1100. In the illustrative example, retainers 1116 take the form of loops, bands, or some other form that holds strap 1114. In this particular example, strap 1114 in retainers 1116 are examples of a physical implementation for compression system 1022 shown in block form in FIG. 10. In this illustrative example, buckle 1118 is integrated with strap 1114. Buckle 1118 may be used to cinch and retain strap 1114. In this manner, buckle 1118 may aid in compressing a sealing member against the housing of the engine.

As depicted in this illustrative example, window 1120 is located in structure 1102. Window 1120 is positioned centrally in structure 1102 in this illustrative example. As depicted, window 1120 allows for viewing of the interior of cover 1100.

Further, cover 1100 also includes handle 1122 and handle 1124. These handles may be used to position, install, remove, or perform other operations with respect to cover 1100.

Figure 12:
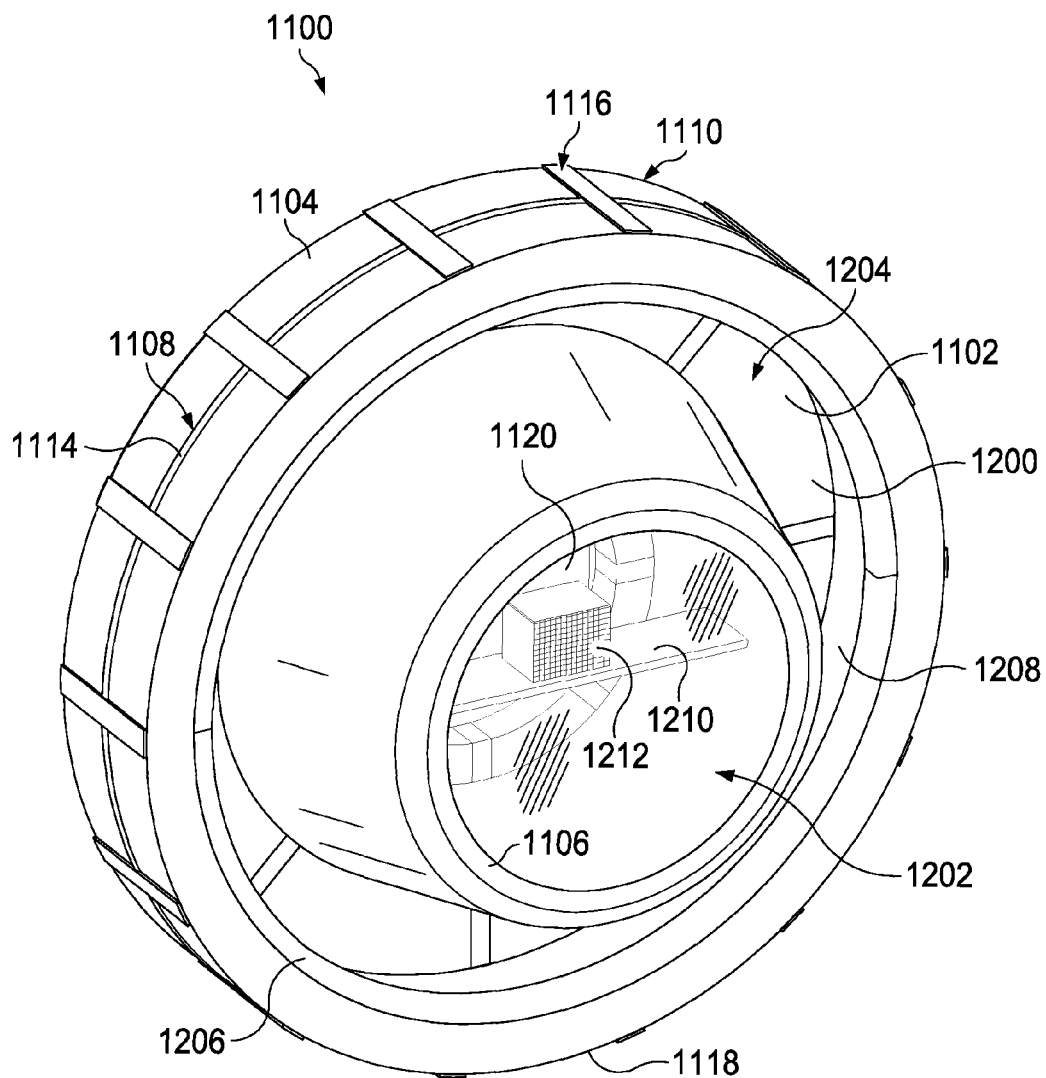
FIG. 12 is an illustration of another perspective view of a cover in accordance with an illustrative embodiment.

With reference next to FIG. 12, an illustration of another perspective view of cover 1100 is depicted in accordance with an illustrative embodiment. In this view, a perspective view of cover 1100 is shown in the direction of lines 12-12 in FIG. 12.

In this view, flange 1104 and retaining feature 1106 extend from interior side 1200 of structure 1102. Interior side 1200 is the side that faces the engine when cover 1100 is installed.

Hollow portion 1202 in retaining feature 1106 is seen in this view of cover 1100. Also seen in this view, retaining feature 1106 and flange 1104 form channel 1204. As depicted, channel 1204 is configured to receive an end of the housing and form an interference fit with a portion of an interior surface of the housing. For example, channel 1204 may receive an inlet of engine.

Also seen in this view is sealing member 1206. In this particular example, sealing member 1206 takes the form of a bulb seal. As can be seen, sealing member 1206 is associated with inner surface 1208 of flange 1104. Sealing member 1206 reduces an amount of moisture that may enter an engine through the opening in the housing of the engine at the front part of the housing covered by cover 1100.

In this illustrative example, holding structure 1210 is located within hollow portion 1202. In this example, holding structure 1210 takes the form of a shelf on which desiccant 1212 may be placed. In this illustrative example, desiccant 1212 may be inspected through window 1120 to determine whether desiccant 1212 needs to be replaced.

Figure 13:
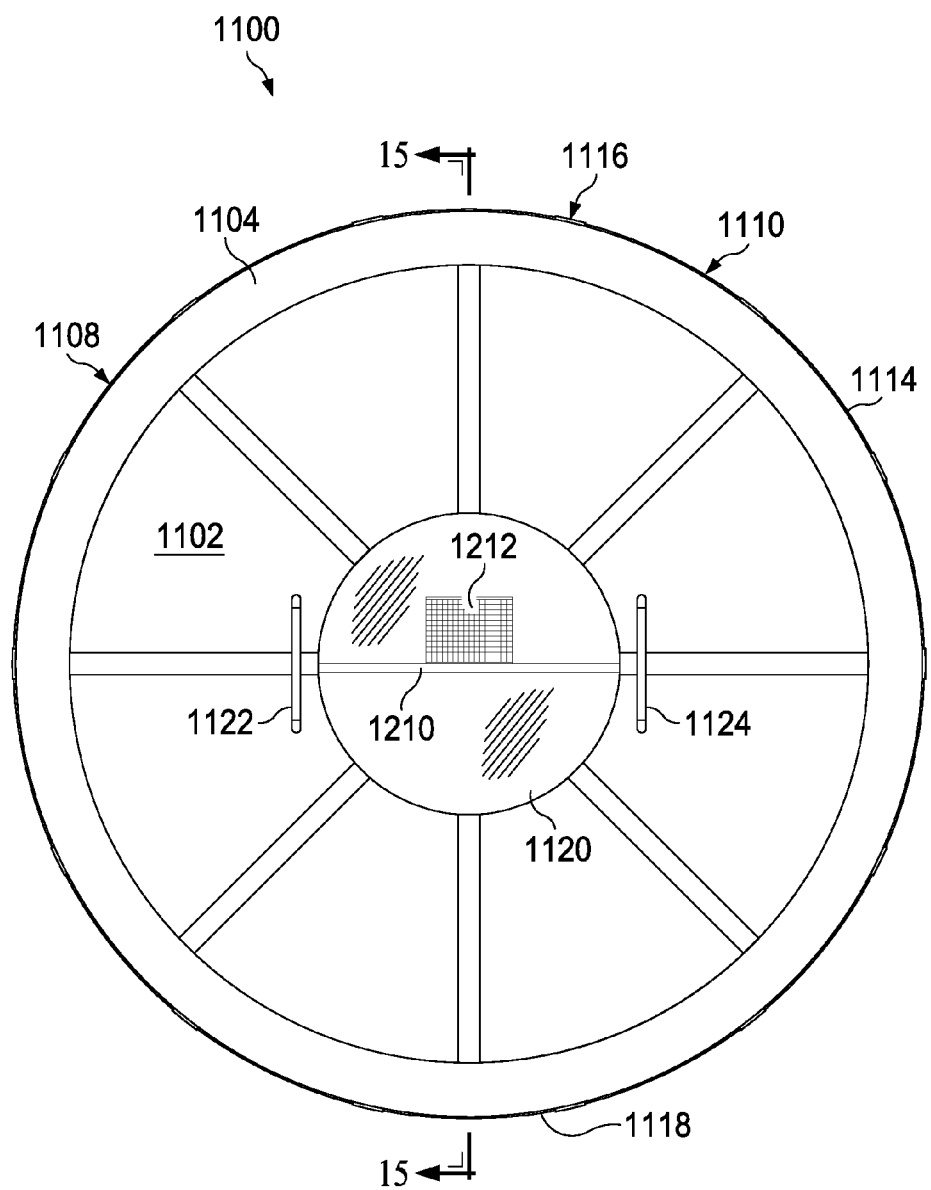
FIG. 13 is an illustration of a front view of a cover in accordance with an illustrative embodiment.

In FIG. 13, an illustration of a front view of cover 1100 is depicted in accordance with an illustrative embodiment. A view of cover 1100 is shown in the direction of lines 13-13 in FIG. 11.

Figure 14:
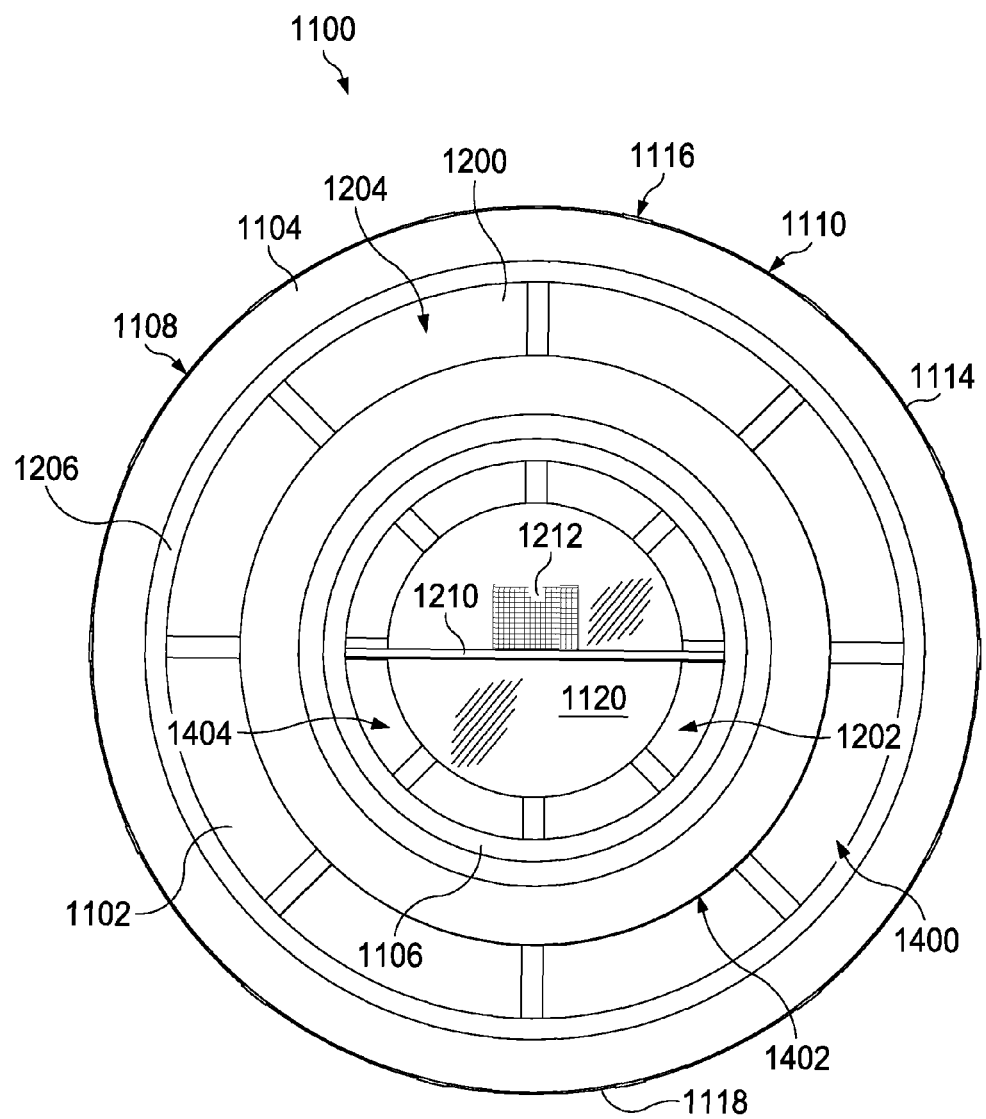
FIG. 14 an illustration of a rear view of a cover in accordance with an illustrative embodiment.

With reference to FIG. 14, an illustration of a rear view of cover 1100 is depicted in accordance with an illustrative embodiment. A view of cover 1100 is shown in the direction of lines 14-14 in FIG. 11.

In this view, different portions of structure 1102 are seen. The portions include an outer portion, a middle portion, and an inner portion.

In this view, flange 1104 extends from outer portion 1400 of structure 1102. Retaining feature 1106 extends from middle portion 1402 of structure 1102. Hollow portion 1202 extends to inner portion 1404 of structure 1102.

Figure 15:
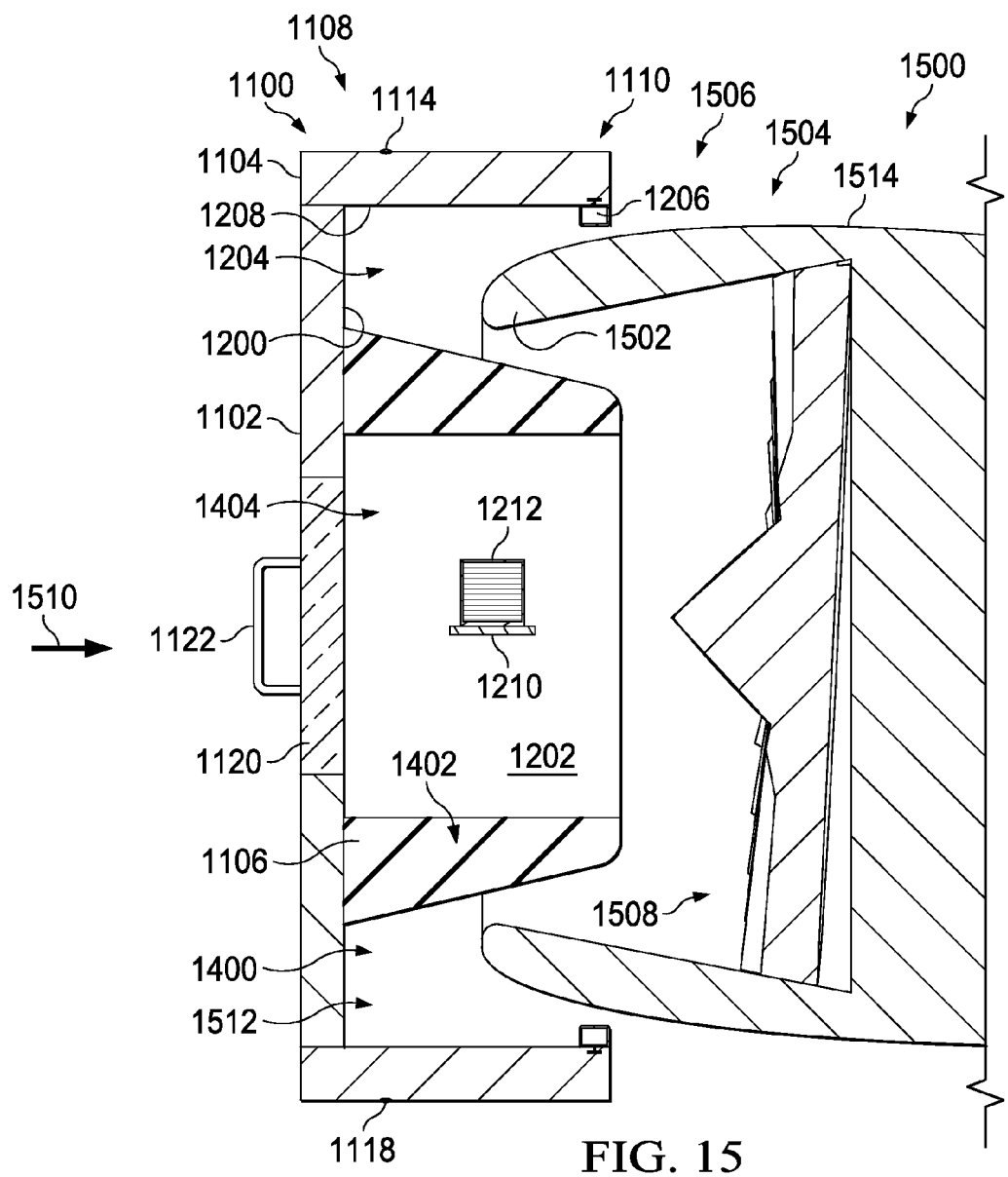
FIG. 15 is an illustration of a cross-sectional view of a cover on an engine in accordance with an illustrative embodiment.

In FIG. 15, an illustration of a cross-sectional view of cover 1100 on engine 1500 is depicted in accordance with an illustrative embodiment. In this illustration, a cross sectional view of cover 1100 taken along lines 15-15 in FIG. 13 is shown.

In this example, cover 1100 is shown on engine 1500. As can be seen in this view, flange 1104 extends past inlet 1502 on housing 1504 of engine 1500. Sealing member 1206 is configured to reduce moisture that may enter from exterior 1506 and reach interior 1508 of engine 1500.

Also, flange 1104 extends past inlet 1502 in this particular example. Extension of flange 1104 in conjunction with the location of sealing member 1206 past inlet 1502 in aft direction 1510 reduces moisture that may reach inlet 1502 located in sealed volume 1512. In the illustrative example, sealed volume 1512 is a volume defined by cover 1100 and housing 1504 that is sealed against moisture. This seal may reduce or prevent moisture from entering sealed volume 1512.

As depicted, sealing member 1206 engages exterior surface 1514 of housing 1504 of engine 1500. In other words, sealing member 1206 touches exterior surface 1514. This type of engagement may or may not provide a desired level of sealing to reduce moisture from reaching inlet 1502. In other words, in some cases the engagement of sealing member 1206 may be sufficient when cover 1100 is installed in engine 1500. In other illustrative examples, the level of engagement may not be as great as desired.

Figure 16:
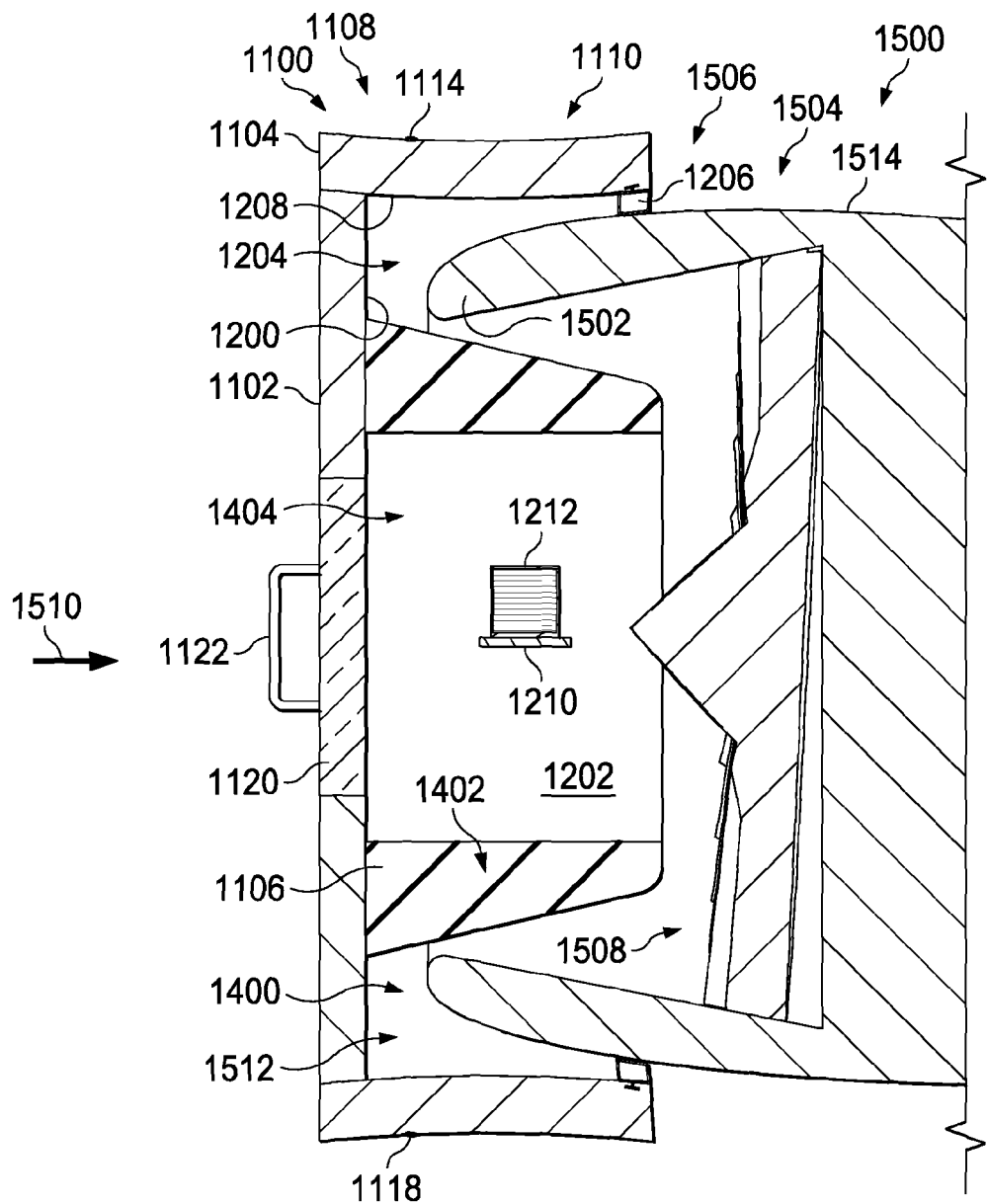
FIG. 16 is an illustration of a cross-sectional view of a cover with a compressed seal on an engine in accordance with an illustrative embodiment.

Turning next to FIG. 16, an illustration of a cross-sectional view of cover 1100 with a compressed seal on engine 1500 is depicted in accordance with an illustrative embodiment. In this example, strap 1114 has been manipulated to cause sealing member 1206 to be compressed against exterior surface 1514 of housing 1504 on engine 1500. In particular, strap 1114 may cause deformation of flange 1104, which, in turn, causes deformation of sealing member 1206 in the form of compressing sealing member 1206. This compression increases the engagement of sealing member 1206 against exterior surface 1514 of housing 1504 and may provide a desired level of sealing against the entry of moisture to inlet 1502 and into interior 1508 of housing 1504.

As can be seen in this illustrative example, the inner surface of flange 1104 and exterior surface 1514 of retaining feature 1106 form channel 1204 without contacting inlet 1502 of engine 1500. Sealing member 1206 also did not contact inlet 1502 in this illustrative example.

The different components shown in FIGS. 11-16 may be combined with components in FIG. 10, used with components in FIG. 10, or a combination of the two. Additionally, some of the components in FIGS. 11-16 may be illustrative examples of how components shown in block form in FIG. 10 can be implemented as physical structures. For example, although compression system 1022 in block form in FIG. 10 is shown as being physically implemented using strap 1114, compression system 1022 may be implemented in other ways. For example, compression system 1022 may be implemented using a metal clamp. This metal clamp may be removably connected to structure 1102, flange 1104, or other components in cover 1100.

With reference now to FIG. 17, an illustration of a process for covering an end of a housing for an engine in the form of a flowchart is depicted in accordance with an illustrative embodiment. The process depicted in FIG. 10 may be used to attach a cover, such as cover 100 in FIG. 1 or cover 1000 in FIG. 10, to the end of a housing for an engine, such as end 116 of housing 108 for engine 102 in FIG. 1.

The process begins by positioning the cover relative to the end of the housing for the engine such that an interior side of a structure for the cover faces the end of the housing (operation 1700). The cover may comprise the structure as well as a flange and a retaining feature. In operation 1700, the cover may be positioned such that the flange and the retaining feature extend from the interior side of the structure in a direction towards the end of the housing for the engine.

Thereafter, the cover is moved in a direction towards the end of the housing for the engine such that the retaining feature extends into an inlet of the engine through the opening of the housing (operation 1702). The cover is then pushed in the direction towards the end of the housing such that an outer surface of the retaining feature pushes against an interior surface of the housing for the engine to form an interference fit with a portion of the interior surface of the housing (operation 1704).

In operation 1704, the retaining feature is moved into the inlet until an interference fit is formed with a desired level of stiction. The cover is considered attached to the end of the housing when the interference fit has been formed with the desired level of stiction.

The process then engages the sealing system (operation 1706), with the process terminating thereafter. This engagement may be formed by compressing the sealing system against the housing with a compression system configured to compress the group of sealing members. This engagement forms a sealed volume defined by the cover and the housing of the engine. This sealed volume is one that is sealed in a manner that reduces the entry of moisture and is not necessarily airtight. In other words, the sealed volume may be resistant to the entry of moisture into the sealed volume that is caused by rain or other environmental conditions that the engine may be exposed to during storage.

Turning next to FIG. 18, an illustration of a process for producing moisture is depicted in accordance with an illustrative embodiment. The process illustrated in FIG. 18 may be implemented using cover 1000 in FIG. 10.

The process begins by placing a desiccant on a holding structure within a hollow portion of the retaining feature (operation 1800). In these illustrative examples, the desiccant may be placed in a holding structure prior to installation of the cover. In other illustrative examples, the inspection window may be opened to place the desiccant on the holding structure.

This desiccant may be used to remove or reduce moisture that may enter or be present in the sealed volume. For example, if the sealed volume is not airtight, humidity may introduce moisture.

Thereafter, the process inspects a status of the desiccant through an inspection window located in the structure (operation 1802). A determination is made as to whether the desiccant should be replaced (operation 1804). This determination may be made by identifying a color of the desiccant. The desiccant may be configured to change to a particular color when the desiccant has been saturated with moisture and needs replacement.

If the desiccant should be replaced, the desiccant is removed and a new desiccant is placed into the holding structure (operation 1808). The process waits for a period of time and then returns to operation 1802. The period of time may be periodically or non-periodic depending on the particular implementation. The process also proceeds to operation 1802 if the desiccant does not need to be replaced.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1706 is not a separate operation from installation of the cover in the prior operations. For example, the engagements of the sealing system may occur at the same time the cover is installed if installment of the cover causes engagement in the sealing system.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in the form of a block diagram in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in the form of a block diagram in which an illustrative embodiment may be implemented. In this example, aircraft 2000 is produced by aircraft manufacturing and service method 1900 in FIG. 19. Aircraft 2000 may be an example of one manner in which aircraft 106 in FIG. 1 may be implemented.

Aircraft 2000 may include airframe 2002 with plurality of systems 2004 and interior 2006. Examples of systems 2004 include one or more of propulsion system 2008, electrical system 2010, hydraulic system 2012, and environmental system 2014.

Any number of other systems may be included. Although an aerospace example is shown, different illustrative embodiments may be applied to other industries, such as the automotive industry, the marine industry, the energy industry, the construction industry, or some other suitable type of industry.

Apparatuses and methods embodied herein may be employed during at least one of the stages of aircraft manufacturing and service method 1900 in FIG. 19. For example, without limitation, cover 100 in FIG. 1 may be used to cover a jet engine for aircraft 2000 during at least one of component and subassembly manufacturing 1906, system integration 1908, and maintenance and service 1914.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19.

One or more apparatus embodiments, method embodiments, or a combination thereof may be utilized while aircraft 2000 is in service 1912 and/or during maintenance and service 1914 in FIG. 19. Use of the different illustrative embodiments may protect an inlet for an engine in aircraft 2000 from, for example, without limitation, debris, foreign objects, weather conditions, birds nesting within the inlet, and/or other types of situations. Further, the different illustrative embodiments provide a cover that can cover and protect the leading edge of the housing for the engine in aircraft 2000.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

In this manner, the use of a cover with a sealing system and other components may provide protection against moisture and reduce the effects of moisture on an engine. For example, the reduction of moisture may reduce discoloration that may be caused by moisture contacting an inlet of the engine over a period of time. As a result, the operations to remove the discoloration for aesthetics may be reduced or avoided. Also, the use of a desiccant may also reduce moisture that may cause undesired inconsistencies in an engine.

Further, the installation of the cover may reduce the need for the use of tape and plastic currently used to cover and seal engine housings from moisture. As a result, the use of one or more features in the different illustrative examples may reduce the maintenance cost for an aircraft.

Further embodiments recognize and account for conditions around an aircraft that may apply a dislodge force that may act to remove or dislodge cover 1000, retaining feature 1006, flange 1004, and/or sealing system 1008 from a position, relative to engine 102 housing 108, that performs an intended use and/or function of the respective cover 1000, retaining feature 1006, flange 1004, and/or sealing system 1008 connected to housing 108. The dislodge force that may act to remove or dislodge cover 1000, retaining feature 1006, flange 1004, and/or sealing system 1008 from the position, relative to engine 102 housing 108, via overcoming a stiction force and/or a compression that may act to hold cover 1000, retaining feature 1006, flange 1004, and/or sealing system 1008 in the position that performs the intended use and/or function of the respective cover 1000, retaining feature 1006, flange 1004, and/or sealing system 1008 connected to housing 108.

Without limitation, cover 1000, a dislodge force acting on retaining feature 1006, flange 1004, and/or sealing system 1008 may come from wind gusts, exhaust from other another vehicle and/or piece of equipment, accumulations of snowfall on an engine and/or effects of other precipitation, and/or contact with another vehicle. Equipment, and/or personnel. Other equipment may include, without limitation, tools used on and/or around engine 102, and/or ground air, electrical, hydraulic, and/or lighting units.

Figure 21:
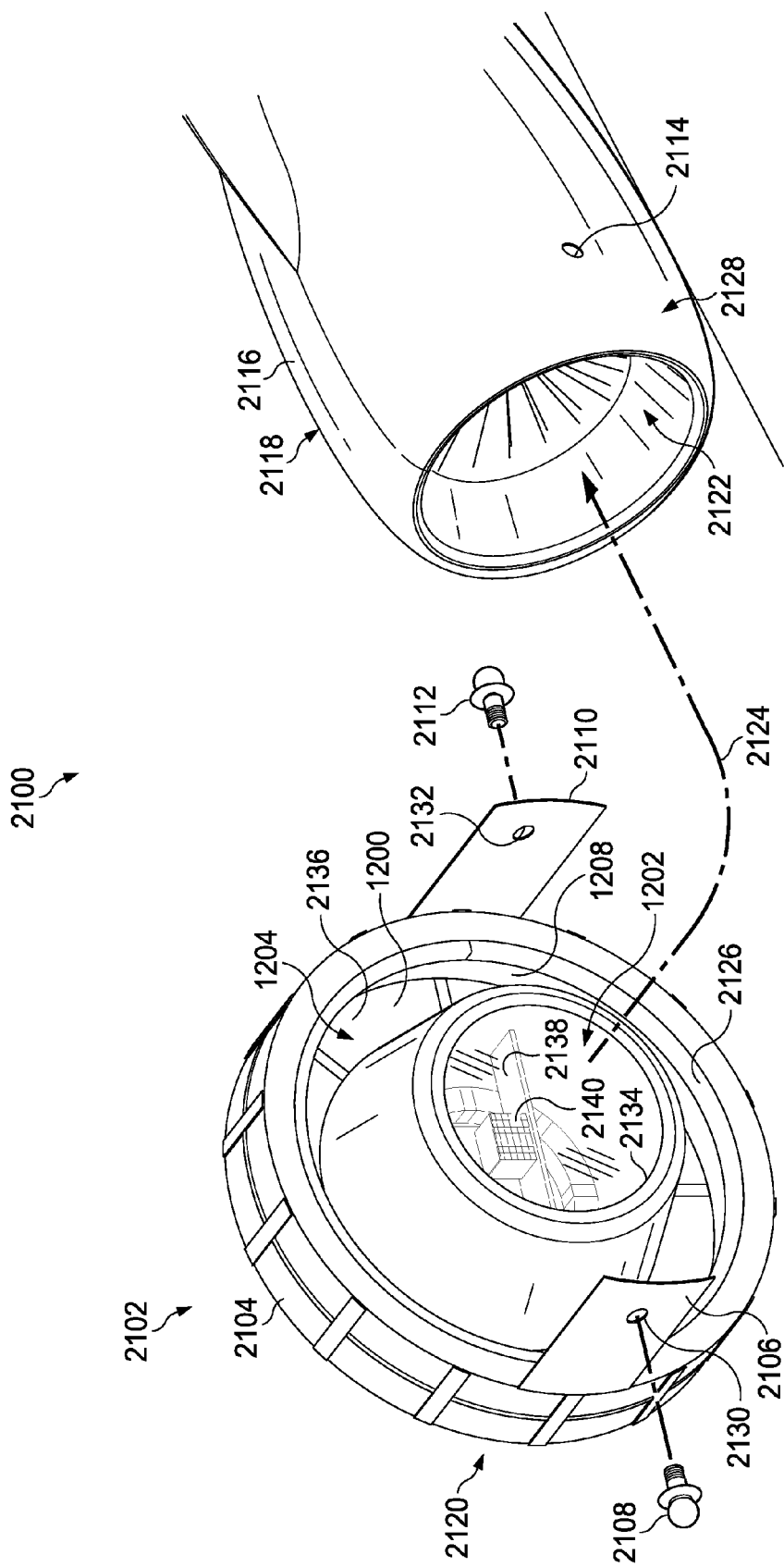
FIG. 21 is an illustration of perspective view of a secondary retention system for a cover for an engine housing, is depicted in accordance with an illustrative embodiment.

Turning now to FIG. 21, an illustration of a perspective view of a secondary retention system for a cover for an engine housing is depicted in accordance with an illustrative embodiment. Secondary retention system 2100 may include cover 2102, flange 2104, panel 2106, Darkscrew 2108, panel 2110, Darkscrew 2112, receptacle 2114, and receptacle for Darkscrew 2112 (not visible in FIG. 21) in housing 2116 in engine 2118. The sizes of cover 2102, Darkscrew 2108, Darkscrew 2112, and receptacle 2114 are not presented to scale, but to present relative positioning of these features relative to each other and cover 2102 housing 2116 and engine 2118. Without limitation, and as will be further described in detail with FIG. 22 and FIG. 23 below, Darkscrew 2108 and/or Darkscrew 2112 may each be an embodiment of a device, which may be a part of a secondary retention system, which may facilitate retaining to a cover to an engine housing, such as without limitation, cover 2102 to housing 2116 in engine 2118.

Without limitation, cover 2102 may be an example of an illustrative embodiment of cover 1000 in FIG. 10, and/or cover 1100 in FIG. 11. Without limitation, flange 2104 may be an example of flange 1004 in FIG. 10 and/or flange 1104 in FIG. 11, in accordance with an illustrative embodiment. Without limitation, housing 2116 may be an example of an illustrative embodiment of housing 108 in FIG. 1, housing 620 in FIG. 6 or FIG. 8, and/or housing 1504 in FIG. 15. Without limitation, engine 2118 may be an example of an illustrative embodiment of engine 102 in FIG. 1, engine 608 in FIG. 6 or FIG. 8, and/or engine 1500 in FIG. 15.

Panel 2106 and panel 2110 may each be an extension of flange 2104 of sealing system 2120. Panel 2106 may be appended to cover 2102 by being appended to flange 2104. Flange 2104 and sealing system 2120 may be an example of flange 1104 and sealing system 1108 of FIG. 11 in accordance with an illustrative embodiment. When cover 2102 may be placed in inlet 2122 of housing 2116 of engine 2118, as indicated by arrow 2124, such that sealing member 2126 of sealing system 2120 may be engaged with housing 2116 and retaining feature 2134 may be engaged with inlet 2122, then opening 2130 in panel 2106 may align with receptacle 2114 and opening 2132 may align with receptacle for Darkscrew 2112 (not visible in FIG. 21). Sealing member 2126 may be a nonlimiting example of one of group of sealing members 1020 of FIG. 10, and/or sealing member 1206 of FIG. 12 and/or FIG. 14 through FIG. 16, in accordance with an illustrative embodiment. Inlet 2122 may be a nonlimiting example of inlet 114 of FIG. 1, inlet 706 of FIG. 7, and/or inlet 1502 of FIG. 15, in accordance with an illustrative embodiment.

Panel 2106 and panel 2110 may be located on flange 2104 at positions that align with locations for receptacle 2114 and receptacle for Darkscrew 2112 respectively. Panel 2106 may be made of any durable material that is flexible to form to shape of housing 2116 and will not, without limitation, scratch and/or damage housing 2116. Without limitation, panel 2106 and panel 2110 may be made from a same material as used to make flange 2104. Flange 2104 and/or panel 2106 and/or panel 2110 may be made from a material that may be water resistant and pliable. Flange 2104 and/or panel 2106 and/or panel 2110 may be made from a material that may prevent a moisture intrusion into inlet 2122. Flange 2104 and/or panel 2106 and/or panel 2110 may be made from a material that may allow formability to geometrically compound curves of cowl structure 2128 of housing 2116.

Receptacle 2114 and receptacle for Darkscrew 2112 may be preexisting receptacles in housing 2116. Receptacle 2114 and receptacle for Darkscrew 2112 may each be positioned, sized, and made of a shape and a material designed for attaching a tool to housing 2116 suitable for hoisting and/or transporting housing 2116 and/or cowl structure 122 of FIG. 1 or cowl structure 712 of FIG. 7 and FIG. 9 of housing 2116 of a particular engine. In other words, receptacle 2114 and receptacle for Darkscrew 2112 may each be known to an engine cowl manufacturer as hoist receptacles. An engine cowl may have more hoist receptacles than receptacle 2114 and receptacle for Darkscrew 2112.

A size and a shape of receptacle 2114 and receptacle for Darkscrew 2112 respectively may be identical to each other, or unique from each other, as determined by a manufacturer of engine 2118. Likewise, additional receptacles may also be present in housing 2116. Spacing of receptacles in housing 2116 may be as designed by the manufacturer of engine 2118. Receptacle 2114 and receptacle for Darkscrew 2112 may be located at approximately a 3 O'clock and a 9 O'clock position on housing 2116. Hence panel 2106 and panel 2110 may extend from flange 2104 at approximately a 3 O'clock and a 9 O'clock position on flange 2104 of sealing system 2120.

Panel 2106 may have opening 2130. Opening 2130 in panel 2106 may be designed to receive and retain Darkscrew 2108. Darkscrew 2108 may rotate within opening 2130. Darkscrew 2108 may engage with receptacle 2114 while opening 2130 retains Darkscrew 2108.

Opening 2132 in panel 2110 may be designed to receive and retain Darkscrew 2112. Darkscrew 2112 may rotate within opening 2132. Darkscrew 2112 may engage with receptacle for Darkscrew 2112 while opening 2132 retains Darkscrew 2112. Generally, any feature, use, characteristic, and/or function of Darkscrew 2112 may be identical to Darkscrew 2108. Alternatively, any feature, use, characteristic, and/or function of Darkscrew 2112 may be uniquely designed to accommodate a specific feature of the receptacle for Darkscrew 2112. The receptacle for Darkscrew 2112 being any receptacle that Darkscrew 2112 may engage in.

The illustrative embodiments recognize and take into account that if cover 2102 or any components of cover 2102 were to become disconnected from cover 2102, they might fall into inlet 2122 of engine 2118, or onto a ramp area around engine 2118, where they might possibly cause foreign object damage (FOD) to engine 2118 or some other engine on the ramp area. Thus, cover 2102 may be constructed as a single integrated object with all components integrally formed to minimize any chance of separation.

Accordingly, panel 2106 and panel 2110 may each be connected to flange 2104 in any suitable manner such that panel 2106 and/or panel 2110 may be unlikely to become disconnected from flange 2104 and cover 2102. Without limitation, panel 2106 and panel 2110 may be integrally produced with flange 2104. Panel 2106 and panel 2110 being integrally formed with flange 2104 such that panel 2106 does not interfere or hinder with engagement or sealing of sealing system 2120 against housing 2116 such that entry of moisture into inlet remains blocked by sealing system 2120.

Alternatively, panel 2106 and panel 2110 may be connected to flange 2104 via stitching or any means that would not adversely affect the seating and function of sealing system 2120. Additionally, any manner of connecting panel 2106 and/or panel 2110 to flange 2104 must be able to withstand any forces acting on panel 2106, panel 2110, and/or flange 2104 that might act to separate panel 2106 and/or panel 2110 from flange 2104. Without limitation, such forces acting on panel 2106, panel 2110, and/or flange 2104 may include at least any dislodge force that may act to remove or dislodge cover 2102, retaining feature 2134, flange 2104, and/or sealing system 2120 from a position, relative to housing 2116, that performs an intended use and/or function of the respective cover 2102, retaining feature 2134, flange 2104, and/or sealing system 2120 connected to housing 2116.

Secondary retention system 2100 may allow a reduction in a size requirement for a primary retaining feature, such as without limitation retaining feature 1006 of FIG. 10 and/or retaining feature 1106 of FIG. 11 through FIG. 14, in accordance with an illustrative embodiment. With secondary retention system 2100 present, retaining feature 2134 and/or retaining feature 1006 of FIG. 10 may not need to be as long and/or extend as deeply into inlet 114 of FIG. 1 to provide a stable and secure fit for retaining feature 2134 and/or retaining feature 1006 of FIG. 10 as it may need to be without secondary retention system 2100 as shown by retaining feature 1106 of FIG. 11 through FIG. 14. By allowing retaining feature 2134 and/or retaining feature 1006 of FIG. 10 to not be as long, less material is needed constructing retaining feature 2134 and cover 2102 as compared to retaining feature 1006 of FIG. 10 that may not include secondary retention system 2100, such as without limitation retaining feature 1106 of FIG. 11 through FIG. 14.

Using less material may reduce at least a cost, a weight, an overall size, and a storage and/or transport space required for retaining feature 2134 and/or retaining feature 1006 of FIG. 10, which may reduce a thickness, a density, a strength, and/or an amount of material needed for structure 2136, as compared to structure 124 of FIG. 1 and/or structure 1002 of FIG. 10 not using secondary retention system 2100.

Additionally, reducing a size of retaining feature 2134, retaining feature 1006 of FIG. 10, and/or retaining feature 1106 of FIG. 11 and/or FIG. 12, may reduce a space available for holding structure 2138 inside retaining feature 2134, which may further reduce a weight, size, complexity, and strength requirement of retaining feature 2134 for cover 2102. Desiccant 2140 may be retained by a non-rigid holding structure. Desiccant 2140 may be supported by a hammock or a bladder holding feature as shown below in further detail in FIG. 27 and FIG. 28. Holding structure 2138 and desiccant 2140 may be unlimiting examples of holding structure 1028 and desiccant 1030 of FIG. 10, and/or holding structure 1210 and desiccant 1212 of FIG. 12, in accordance with an illustrative embodiment.

Using less material for structure 2136 and/or retaining feature 2134 and/or retaining feature 1006 of FIG. 10 may reduce at least one of: a cost, a weight, an overall size, and a storage and/or transport space required for cover 2102 as compared to cover 100 of FIG. 1 and/or cover 1000 of FIG. 10 without secondary retention system 2100. Therefore, by adding Secondary retention system 2100 to cover 2102, as compared to a cover, such as without limitation cover 100 of FIG. 1 and/or cover 1000 of FIG. 10 without secondary retention system 2100, at least one of: a cost, a time, a material, and equipment required for manufacturing cover 2102 may be reduced as compared to those factors for a cover, such as without limitation cover 100 of FIG. 1 and/or cover 1000 of FIG. 10 without secondary retention system 2100.

Figure 22:
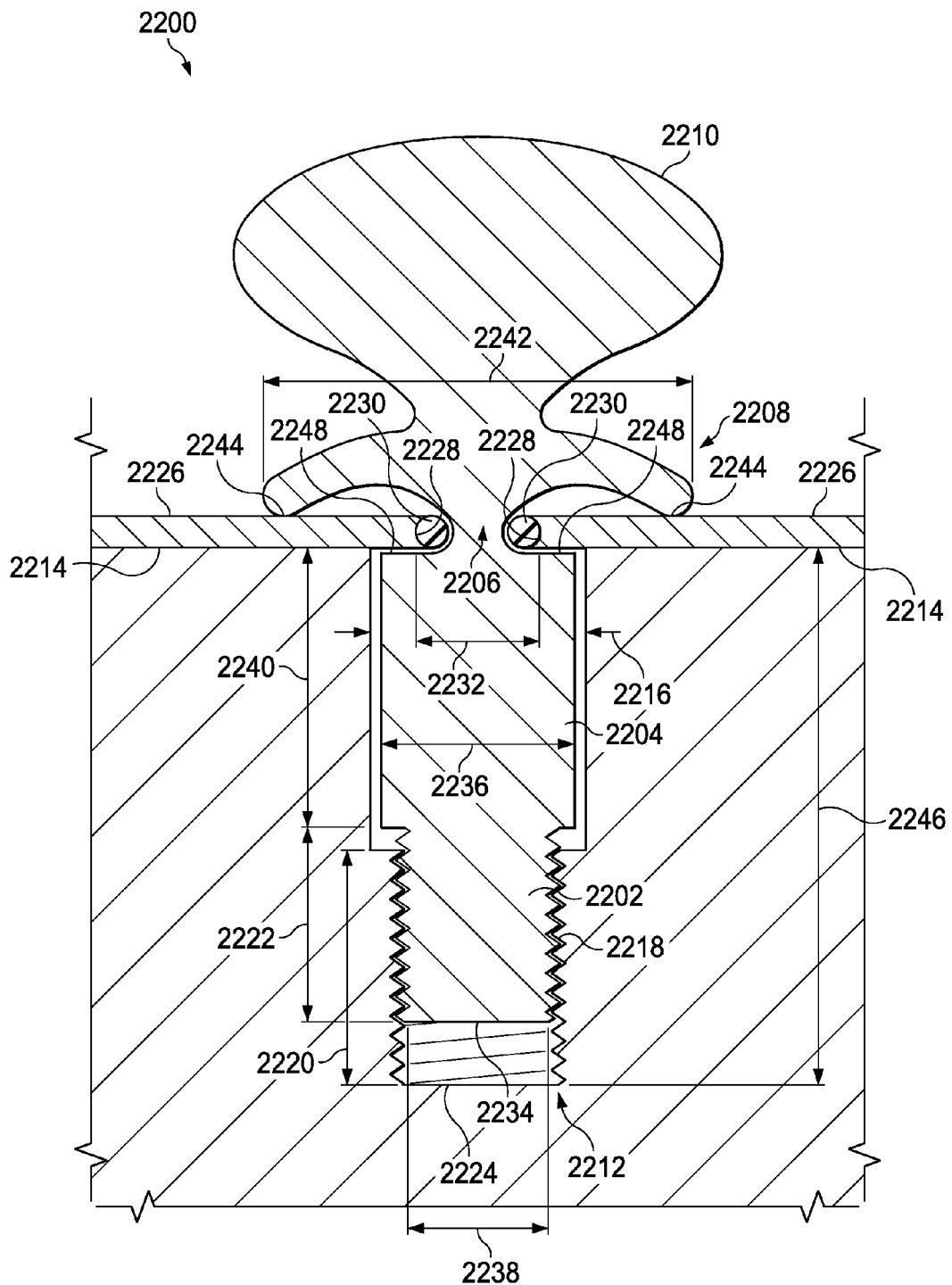
FIG. 22 is illustration of a plan view cross section of a Darkscrew component of a secondary retention system, for a cover for an engine housing, engaged in a receptacle in the engine housing, depicted in accordance with an illustrative embodiment.

Turning now to FIG. 22, an illustration of a plan view cross section of a Darkscrew component of a secondary retention system, for a cover for an engine housing, engaged in a receptacle in the engine housing, is depicted in accordance with an illustrative embodiment. Darkscrew 2200 may be a proper name given to a component of a secondary retention system for a cover for an engine inlet. Darkscrew 2200 may include threads 2202, extension 2204, neck 2206, saucer 2208, and head 2210.

Darkscrew 2200 may be made from a single material, or from a blend of materials. Darkscrew 2200 may be a nonlimiting example of Darkscrew 2108 or Darkscrew 2112 of FIG. 21, in accordance with an illustrative embodiment. Darkscrew 2200 may connect to receptacle 2212 in housing 2214 via an operator manually holding onto head 2210 and placing threads 2202 into receptacle 2212, and manually connecting threads 2202 to receptacle 2212. Without limitation manually connecting threads 2202 to receptacle 2212 may mean using head 2210 like a thumbscrew, and screwing Darkscrew 2200 into receptacle 2212. Receptacle 2212 may be a nonlimiting example of receptacle 2114 and/or receptacle for Darkscrew 2112 of FIG. 21, in accordance with an illustrative embodiment. Housing 2214 may be a nonlimiting example of housing 2116 of FIG. 21, in accordance with an illustrative embodiment.

In a nonlimiting example receptacle 2212 may have a diameter 2216 of 0.365 inches. Receptacle 2212 may recess into housing 2214 with depth 2246. Depth 2246 may be ¾ inch. Receptacle 2212 may have threading 2218. Without limitation, threading 2218 may be ⅜ inch fine threads. Without limitation, threading 2218 may have length 2220 that may be 1 inch. Length 2222 of threads 2202 may be less than length 2220 of threading 2218. Thus, threads 2202 may not bottom out on bottom 2224 of receptacle 2212. Thus, Darkscrew 2200 may not generate a thread loading upon Darkscrew 2200 that may make it unable to remove from receptacle 2212, particularly if head 2210 shears off of Darkscrew 2200.

Without limitation, Darkscrew 2200 may be incorporated into panel 2226. Darkscrew 2200 may be a nonlimiting example of Darkscrew 2108 of FIG. 21 in accordance with an illustrative embodiment. Panel 2226 may be a nonlimiting example of panel 2106 and/or panel 2110 of sealing system 2120 as shown in FIG. 21, in accordance with an illustrative embodiment. Panel 2226 may have opening 2228 rimmed by grommet 2230. Grommet 2230 may be any material that includes sufficient elasticity to expand such that threads 2202 and extension 2204 may pass through grommet 2230 in an expanded state, such that grommet 2230 remains constricted around neck 2206 once threads 2202 and extension 2204 have passed through grommet 2230. Thus, grommet 2230 may act as a securing feature that may secure panel 2226 to Darkscrew 2200. Grommet 2230 may secure panel 2226 to Darkscrew 2200 by maintaining a constriction around neck 2206 such that diameter 2236 of top 2248 of extension 2204 may be wider than diameter 2232 of opening 2228 in grommet 2230 when grommet 2230 is not expanded, but is in a contracted state. The contracted state may be a latent state for grommet 2230.

Threads 2202 of Darkscrew 2200 may engage with receptacle 2212 to secure Darkscrew 2200, and thus panel 2106, and thus cover 2102 to housing 2116 as shown in FIG. 21. When receptacle 2212 includes threading 2218, and threads 2202 on Darkscrew 2200 are threaded to match and engage with threading 2218 to generate a tensile loading that secures Darkscrew 2200 to receptacle 2212, length 2222 of threads 2202 may be such that end 2234 of threads 2202 does not contact bottom 2224 of receptacle 2212. Thus, length 2222 of threads 2202 prevents allowing end 2234 of threads 2202 to contact bottom 2224 of receptacle 2212 and generate a tensile column load on threading 2218 that may make threads 2202 difficult to retract from threading 2218, particularly if head 2210 may become separated from of Darkscrew 2200.

Threads 2202 may be an engagement feature of Darkscrew 2200. The engagement feature may connect Darkscrew 2200 to receptacle 2212 by connecting threads 2202 of Darkscrew 2200 with threading 2218 or receptacle 2212. Threads 2202 may form a engagement with receptacle 2212 and/or receptacle for Darkscrew 2112 of FIG. 21, that may be compatible with features of receptacle 2212 for mating Darkscrew 2200, and thus an inlet cover comprising Darkscrew 2200, such as without limitation, cover 2102 of FIG. 21, to receptacle 2212 and thus to housing 2214 of an engine, such as without limitation engine 2118 in FIG. 21.

The illustrative embodiments recognize and take into account that an engine housing manufacturer may not want any item inserted into receptacle 2212 that may hinder effective use of receptacle 2212 for engaging a hoist with housing 2214. As a nonlimiting example, when receptacle 2212 may include threading 2218 for receiving a bolt, the engine housing manufacturer would not want any object inserted into receptacle 2212 that may damage, deform, and/or strip any threading, or become stuck, inside receptacle 2212.

Accordingly threads 2202 may be formed of a material that includes a strength, a toughness, and or a hardness, value that is low enough so as to be unable to damage, deform, and/or strip any retention feature, such as without limitation threading 2218 inside receptacle 2212. As a nonlimiting example, if threads 2202 are inserted into a receptacle in a cross-thread condition, turning head 2210 would cause deformation of material of threads 2202 without causing damage to material of the receptacle that would render the receptacle unsuitable for hoisting the engine housing.

Thus, material forming threads 2202 may be dependent upon the specifications provided for, without limitation, receptacle 2114 by a manufacturer for each particular housing, such as, without limitation, housing 2116 of FIG. 21. Without limitation, threads 2202 may include a material with a tensile strength of 15,000 pounds per inch-squared at negative 67 degrees Fahrenheit and 9,000 pounds per inch-squared at positive 75.5 degrees Fahrenheit.

Threads 2202 may be formed of a material that includes a strength, toughness, and or hardness, value that is high enough to engage with a hoist receptacle, such as without limitation receptacle 2114 of FIG. 21, with a tensile loading such that Darkscrew 2200 may retain cover 2102, retaining feature 1006, flange 1004, and/or sealing system 1008, at least as shown in FIG. 10, in the position, relative to engine 2118 housing 2116, that performs the intended use and/or function of the respective cover 2102, retaining feature 1006, flange 1004, and/or sealing system 1008 connected to housing 2116. Without limitation, tensile loading may be applied to threads 2202 by engaging Darkscrew 2200 into receptacle 2114 by manually turning head 2210 until a desired torque load may be applied to threads 2202 and Darkscrew 2200.

Although the label "threads" is given to threads 2202 section of Darkscrew 2200, the term is used to mean a compatible engagement section of Darkscrew 2200 that will compatibly engage Darkscrew 2200 with a hoist receptacle of a particular engine. The shape and composition of threads 2202 may be tailored to match each specific model of engine housing that threads 2202 may engage.

Accordingly, threads 2202 may be a shape other than threaded. Threads 2202 may be shaped as a spiral thread commonly used for engaging a bolt with a nut.

When the engine manufacturer produces a hoist receptacle that connects to an engine cowl and/or to an engine housing hoist via a form or method other than threading, threads 2202 will be formed into a shape and of a material tailored to connect with the shape and features particular to that hoist receptacle. Thus, threads 2202 may be an engagement feature of Darkscrew 2200 that may engage with an engagement feature of receptacle 2212, which may be without limitation, threading 2218.

As a nonlimiting example, threads 2202 may be formed of solvent resistant Nylon, Type 1 High Strength, such that an attempt to force an improper mating of threads 2202 with a hoist receptacle, such as without limitation receptacle 2114 of FIG. 21, may result in deformation of threads 2202 instead of, without limitation, any damage, deformation, and/or stripping of threading of the hoist receptacle. Threads 2202 and all components of Darkscrew 2200 may be of a material that is solvent resistant.

Extension 2204 may form a contingent retraction feature of Darkscrew 2200. A contingent retraction feature may provide an ability to retract extension 2204 from receptacle 2212 when a normal method of retracting Darkscrew 2200 and extension 2204 from receptacle 2212 is not available. As a nonlimiting example, if Darkscrew 2200 may not be removed from receptacle 2212 via a normal method, such as turning Darkscrew 2200 via turning head 2210, then extension 2204 may provide a surface of Darkscrew 2200 that may be engaged by a tool that may allow turning Darkscrew 2200 to retract Darkscrew 2200 from receptacle 2212. For example, without limitation, a shearing off of head 2210 from Darkscrew 2200 may require a contingent retraction of Darkscrew 2200 from receptacle 2212. The tool may be without limitation, a wrench, a pliers, a clamp, and/or some similar device for gripping and turning an object.

Extension 2204 may include a shape and material that may serve as a contingent retraction device for Darkscrew 2200. In other words, extension 2204 may include a shape and material that facilitates removal of Darkscrew 2200 from receptacle 2212. Without limitation, head 2210 shearing off from extension 2204 may be a nonlimiting example of when extension 2204 may be used to remove extension 2204 and threads 2202 from a hoist receptacle, such as without limitation receptacle 2212.

Extension 2204 may have a cross-sectional area and may include a strength, toughness, and/or hardness, value that are greater than those of neck 2206. Extension 2204 may have length 2240. Extension 2204 may include diameter 2236 and/or a width that may be less than diameter 2216 and/or a width of receptacle 2212. Extension 2204 may include diameter 2236 and/or a width that may be greater than diameter 2238 and/or a width of threads 2202 such that the cross sectional area of extension 2204 may act as a limiter that prevents threads 2202 from traveling deep enough into receptacle 2212 to allow end 2234 of threads to contact bottom 2224 of receptacle 2212.

Extension 2204 may have a cross-sectional area and may include a strength, toughness, and/or hardness, value that allow extension 2204 to be engaged by a back drill to remove extension 2204, and threads 2202 connected to extension 2204, from receptacle 2212 without causing, without limitation, damage, deformation, or hindrance to usability, of receptacle 2212 to engage a hoist for housing 2214. Thus, extension 2204 may serve as a contingent retraction device that allows a back drill to engage a center portion of extension 2204 and rotate extension 2204 and connected threads 2202 out of receptacle 2212.

Top 2248 of extension 2204 may form a part of a capture feature of Darkscrew 2200. The capture feature of Darkscrew 2200 may be a feature that facilitates Darkscrew 2200 being captured and retained within panel 2226. When Darkscrew 2200 is placed through opening 2228 in panel 2226, and panel 2226 retracts around neck 2206, top 2248 of extension 2204 may help retain Darkscrew 2200 within opening 2228. Diameter 2236 of extension 2204 may be greater than diameter 2232 of opening 2228 retracted around neck 2206. Darkscrew 2200 may be impeded from sliding out of panel 2226 through opening 2228, or without limitation through grommet 2230 that may ring opening 2228, in part by a shape and a dimension of top 2248 of extension 2204. Thus, the capture feature of Darkscrew 2200 may engage panel 2226 connected to a cover such as without limitation cover 2102 of FIG. 21. As a nonlimiting example, neck 2206 may be engaged and retained within grommet 2230, which may be attached to serve as a part of panel 2226 connected to a cover such as without limitation cover 2102 of FIG. 21.

Neck 2206 may form a shearing feature of Darkscrew 2200. As a means to prevent damage to receptacle 2212 and/or to assist removal of Darkscrew 2200 if it became unmovable by use of head 2210, neck 2206 may include a cross sectional area and/or a material composition such that it may function as a shear section for Darkscrew 2200. Neck 2206 may fail and separate head 2210 from extension 2204 if head 2210 is manipulated in such a manner as might cause threads 2202 to damage, deform, and/or strip any threading, of an inside of receptacle 2212, such as without limitation threading 2218. Without limitation neck 2206 may prevent a torque load being applied to extension 2204 and/or threads 2202 at a value that may damage, deform, and/or strip any threading 2218, inside receptacle 2212.

Additionally, Neck 2206 may form a part of the capture feature of Darkscrew 2200. The capture feature of Darkscrew 2200 may facilitate Darkscrew 2200 being captured within opening 2228 in panel 2226. When Darkscrew 2200 is pushed through opening 2228 in panel 2226, opening 2228 may contract around neck 2206, such that Darkscrew 2200 may rotate within opening 2228, but Darkscrew 2200 may remain captured within opening 2228 of panel 2226, by opening 2228 of panel 2226 remaining around neck 2206 of Darkscrew 2200.

Saucer 2208 may form another part of the capture feature of Darkscrew 2200. When Darkscrew 2200 is pushed through opening 2228 in panel 2226, a diameter 2242 of saucer 2208 may exceed diameter 2232 of opening 2228, such that Darkscrew 2200 will not penetrate through opening 2228 beyond neck 2206. Thus, panel 2226 may be captured to remain between saucer 2208 and extension 2204 and around neck 2206 of Darkscrew 2200.

Additionally, saucer 2208 may form a sealing feature of Darkscrew 2200. Saucer 2208 may be formed in a slightly curved shape and of a strength and a flexibility such that when Darkscrew 2200 is fully secured into receptacle 2212, lower side 2244 of saucer 2208 presses down on panel 2226 such that panel 2226 is pressed against housing 2214. Saucer 2208 may have a curved shape such that lower side 2244 of saucer 2208 is slightly concave when viewed from threads 2202.

Thus, saucer 2208 pushing against panel 2226 may act to form a compression seal between saucer 2208 and panel 2226, and between panel 2226 and housing 2214, such that moisture and other elements are inhibited from entering into receptacle 2212. Thus, saucer 2208 may inhibit, without limitation, corrosion or damage from occurring to extension 2204 and threads 2202 of Darkscrew 2200 and to receptacle 2212.

Head 2210 may form a manual operation feature of Darkscrew 2200. Head 2210 may be shaped for manual manipulation that may engage Darkscrew 2200 with receptacle 2212. Without limitation, head 2210 may include a shape as shown in FIG. 22, such as a thumbscrew shape, or any other suitable shape for manual manipulation. Manual manipulation may include, but may not require, using a hand tool, to achieve a torque needed to connect panel 2226, and a cover, such as without limitation cover 1000 from FIG. 10, connected to panel 2226, to housing 2214 and resist the dislodge force that may act to remove or dislodge cover 1000, retaining feature 1006, flange 1004, and/or sealing system 1008 from a position, relative to engine 2118 housing 2116, that performs an intended use and/or function of the respective cover 1000, retaining feature 1006, flange 1004, and/or sealing system 1008 connected to housing 2116. As described above, without limitation any feature, function, use, or interaction described for panel 2226 with Darkscrew 2200 and receptacle 2212 may equally apply to Darkscrew 2108, panel 2106, and receptacle 2114, as they apply to Darkscrew 2112, panel 2110, and the receptacle for Darkscrew 2112 in housing 2116.

Figure 23:
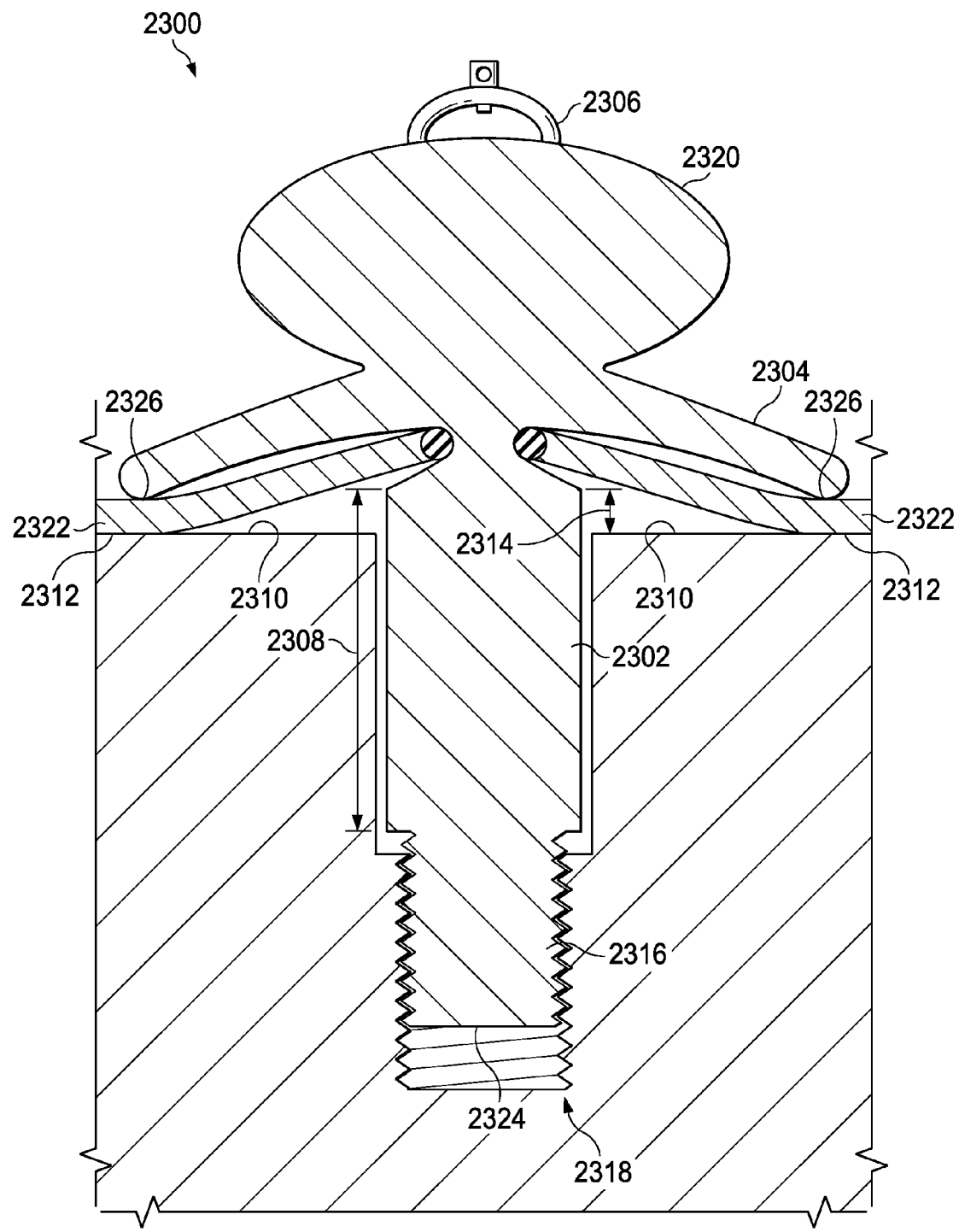
FIG. 23, is an illustration of a plan view cross section of alternate embodiments for a Darkscrew component of a secondary retention system, for a cover for an engine housing, in a receptacle in the engine housing, depicted in accordance with an illustrative embodiment.

Turning now to FIG. 23, an illustration of a plan view cross section of alternate embodiments for a Darkscrew component of a secondary retention system, for a cover for an engine housing, in a receptacle in the engine housing, is depicted in accordance with an illustrative embodiment. Darkscrew 2300 differs from Darkscrew 2200 by having a longer extension 2302 and a greater curve and length to saucer 2304 as compared to extension 2204 and saucer 2208 as described for FIG. 22. Darkscrew 2300 also shows link 2306 added to head 2320 as compared to head 2210 of Darkscrew 2200 in FIG. 22. Link 2306 may also be added to Darkscrew 2200 as it is shown for Darkscrew 2300 whether or not Darkscrew 2200 may be modified by saucer 2304 and extension 2302.

Darkscrew 2300 may have extension 2302 with a length 2308 that may be longer than length 2240 of FIG. 22. Length 2308 may be such that a sufficient amount of extension 2302 may protrude above exterior surface 2310 of housing 2312 by a distance 2314, such that a tool commonly available for work on or around an aircraft may be used to remove extension 2302 and connected threads 2316 from receptacle 2318 if head 2320 may become separated from Darkscrew 2300. Without limitation, extension 2302 may be ⅛ longer than extension 2204, such that distance 2314 may be ⅛ inch.

Additionally, without limitation, extension 2302 may be shaped to match a shape and size of a tool commonly available for work on or around an aircraft. Without limitation, extension 2302 may include a perimeter that may include at least two flat sides that may receive a gripping device, or a hex shaped perimeter or other shape that may be engaged by a wrench, a ratchet, and/or any other tool suitable for grabbing and rotating extension 2302.

To accommodate for distance 2314 that extension 2302 may protrude above exterior surface 2310, saucer 2304 may be more curved than saucer 2208. Saucer 2304 may be more concaved, as viewed from extension 2302, than saucer 2208. Thus, when Darkscrew 2300 is fully inserted into receptacle 2318, and extension 2302 protrudes above exterior surface 2310, of housing 2312, lower side 2326 of saucer 2304 may still press down on panel 2322, and press panel 2322 against exterior surface 2310.

Saucer 2304 pushing against panel 2322 may act to form a compression seal between saucer 2304 and panel 2322, and between panel 2322 and housing 2312, such that moisture and other elements are inhibited from entering into receptacle 2318. Thus, saucer 2304 may inhibit, without limitation, corrosion or damage from occurring to extension 2302 and threads 2324 of Darkscrew 2300 and to receptacle 2318. Thus, saucer 2304 may act as the sealing feature of Darkscrew 2300 in much the same way as saucer 2208 does for Darkscrew 2200 of FIG. 22.

Link 2306 will be further discussed below for a another embodiment of a secondary retention system using either the Darkscrew 2200 embodiment or the Darkscrew 2300 embodiment of the secondary retention system.

The illustrative embodiment recognize and take into account that engines are exposed to weather extremes, fluids, and vapors that may deform, weaken, decay, and/or corrode a component. Without limitation such fluids may include hydraulics, fuels, de-icing fluids, and cleaning solvents. Thus, threads 2202 and/or other components of Darkscrew 2200 and/or threads 2324 and/or other components of Darkscrew 2300 may include materials that may resist deformation, weakening, decay, and/or corrosion due to weather extremes, fluids, and/or vapors that may be expected and/or occur near an aircraft engine, such as without limitation solvent resistant Type 1 High Strength Nylon 1.

Further, the illustrative embodiments recognize and take into account that components used on an aircraft engine may be regulated to be self-extinguishing in the event of a fire. Without limitation, Darkscrew 2200 and/or Darkscrew 2300 may include materials compliant with MIL-P_17091B and/or 14 CFR 25.1193, regulating cowling and nacelle skin.

Figure 24:
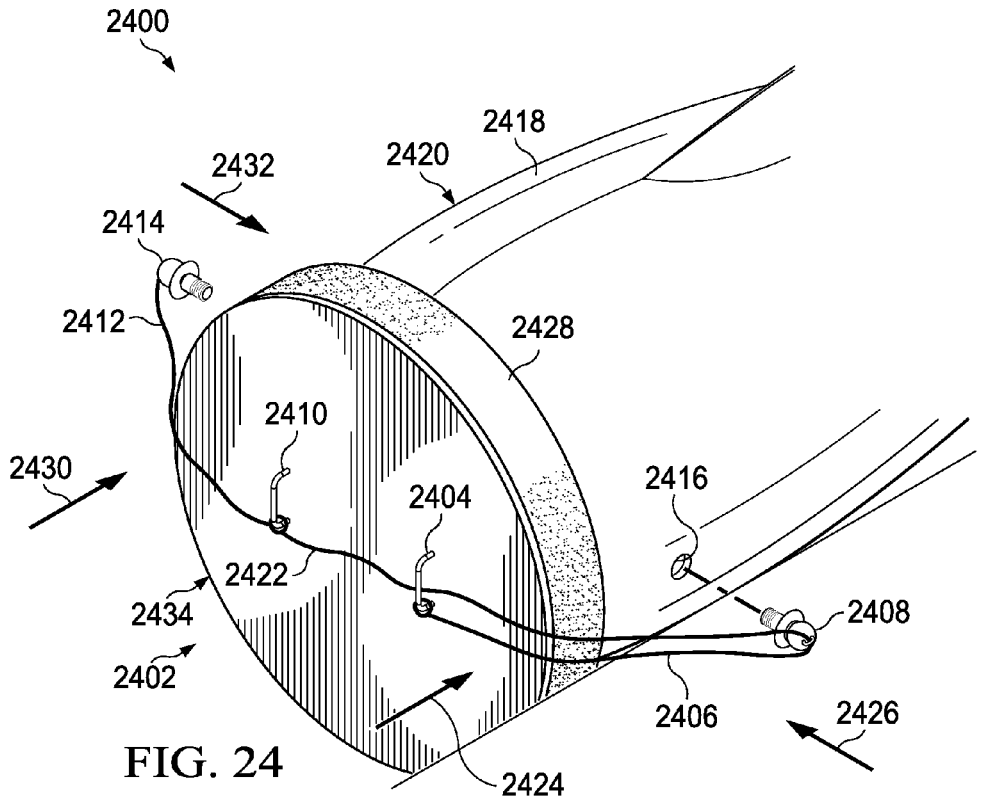
FIG. 24 is an illustration of a perspective view of an alternate embodiment for a secondary retention system, for a cover for an engine housing, in a receptacle in the engine housing, depicted in accordance with an illustrative embodiment.

Turning now to FIG. 24, an illustration of a perspective view of an alternate embodiment for a secondary retention system, for a cover for an engine housing, in a receptacle in the engine housing, is depicted in accordance with an illustrative embodiment. FIG. 24 shows secondary retention system 2400 added on to cover 200 as depicted in FIG. 2 through FIG. 9. Similar to cover 200 as shown and described for FIG. 8, cover 2402 for housing 2418 for engine 2420 may not include a flange or a sealing system. Cover 2402 may be a nonlimiting example of cover 100 of FIG. 1, in accordance with an illustrative embodiment. Thus, cover 2402 may not have a sealing system such as sealing system 1008 of FIG. 10, and/or sealing system 1108 of FIG. 11 through FIG. 16.

Secondary retention system 2400 may include cover 2402, handle 2404, connector 2406, Darkscrew 2408, handle 2410, connector 2412, Darkscrew 2414, and receptacle 2416 and receptacle (not shown in FIG. 24) for Darkscrew 2414 in housing 2418 in engine 2420. The sizes of handle 2404, connector 2406, Darkscrew 2408, handle 2410, connector 2412, Darkscrew 2414, receptacle 2416, and receptacle for Darkscrew 2414 are not presented in proper scale, but to present relative positioning of these features relative to each other and cover 2402, housing 2418, and engine 2420.

In this illustrative example, cover 2402 is shown attached to end 700 (as shown in FIG. 7) of housing 2418. Without limitation handle 2404 may be a nonlimiting example of an illustrative embodiment of one of number of handles 164 in FIG. 1, handle 218 in FIG. 2 and/or FIG. 8. Without limitation housing 2418 may be a nonlimiting example of an illustrative embodiment of housing 108 in FIG. 1, and/or housing 620 in FIG. 6 or FIG. 8. Without limitation engine 2420 may be a nonlimiting example of an illustrative embodiment of engine 102 in FIG. 1, and/or engine 608 in FIG. 6 or FIG. 8.

Connector 2406 may connect Darkscrew 2408 to handle 2404 via any effective means. Connector 2406 may be made of material that is durable and resistant to corrosion and/or degradation in weather conditions that may exist for engine 2420 while not in operation. In other words, without limitation connector 2406 may be made of material that is durable and resistant to corrosion and/or degradation in weather and/or environmental conditions that may exist for engine 2420 in storage or on an aircraft without engine 2420 running.

Without limitation connector 2406 may be a fixed length, may be a bungee cord or similar elastic material that may have some flexibility of length, or may be an adjustable length. Connector 2406 may be long enough for Darkscrew 2408 to reach receptacle 2416 in housing 2418 while one end of connector 2406 remains connected to handle 2404.

Connector 2406 may connect to handle 2404 via any suitable means that may be permanent or a detachable connection. Likewise, connector 2406 may connect to Darkscrew 2408 via any suitable means that may be permanent or detachable. A connection of connector 2406 to handle 2404 and a connection of connector 2406 to Darkscrew 2408 may each be sufficiently strong to withstand any dislodge forces, which may act upon secondary retention system 2100 or any member thereof, without resulting in a separation of connector 2406 from either Darkscrew 2408 or from handle 2404.

Darkscrew 2408 may connect to receptacle 2416 in housing 2418. Darkscrew 2414 may connect to receptacle for Darkscrew 2414. Darkscrew 2414 and connector 2412 and their association with each other may be identical to Darkscrew 2408 and connector 2406 respectively and their association with each other. Connector 2406 may connect to either handle 2404 or handle 2410. When connector 2406 connects to handle 2410 (as represented by 2422), connector 2422 may be longer than connector 2412. When connector 2406 connects to handle 2410, connector 2406 may have a connection to handle 2410 that is distinct from connector 2412, or connector 2406 and connector 2422 may share a connection to handle 2410.

Connector 2406 and connector 2412 may each be short enough so that when Darkscrew 2408 connects to receptacle 2416, and Darkscrew 2414 connects to receptacle for Darkscrew 2414, secondary retention system 2100 acts to retain cover 2402, retaining feature 1006, flange 1004, and/or sealing system 1008, at least as shown in FIG. 10, from a position, relative to engine 102 housing 108, that performs the intended use and/or function of the respective cover 2402, retaining feature 1006, flange 1004, and/or sealing system 1008 connected to housing 108.

Receptacle 2416 and receptacle for Darkscrew 2414 may be preexisting receptacles in housing 2418. Receptacle 2416 and receptacle for Darkscrew 2414 may each be positioned, sized, and made of a shape and a material designed for attaching a tool to housing 2418 suitable for hoisting and/or transporting housing 2418 and/or cowl structure 122 of FIG. 1 or cowl structure 712 of FIG. 7 and FIG. 9 of housing 2418 of a particular engine. In other words, receptacle 2416 and receptacle for Darkscrew 2414 may each be known to an engine cowl manufacturer as hoist receptacles. An engine cowl may have more hoist receptacles than receptacle 2416 and receptacle for Darkscrew 2414. Thus, receptacle 2416 and receptacle for Darkscrew 2414 may be identical to each other or unique from each other at determined by a manufacturer of engine 2420. Likewise, additional receptacles may also be present in housing 2418. Spacing of receptacles in housing 2418 may be as designed by the manufacturer of engine 2420. Receptacle 2416 and receptacle for Darkscrew 2414 may be located at approximately a 3 O'clock and a 9 O'clock position on housing 2418.

The connection between connector 2406 and Darkscrew 2408 and between connector 2412 and Darkscrew 2414 may each be formed such that when a particular Darkscrew must be rotated to be connected to its respective receptacle, that the connection between the particular Darkscrew and its respective connector is such that the particular Darkscrew may be rotated without being hindered by an attached connector. Connector 2406 may be connected to Darkscrew 2408, via without limitation, a link on Darkscrew 2408 such as link 2306 shown above in FIG. 23. Alternatively, connector 2406 may connect to Darkscrew 2408 via, without limitation, a ring (not shown) around Darkscrew 2408 that encircles Darkscrew 2408 between head 2320 and saucer 2304, as shown in FIG. 23.

One of ordinary skill in the art may recognize that when Darkscrew 2408 may be secured into receptacle 2416 and Darkscrew 2414 may be secured into receptacle for Darkscrew 2414, that connector 2406 may apply force 2424 against cover 2402. Force 2424 may act to push retaining feature 128 into inlet 114 (see FIG. 1) of engine 2420. Connector 2406 may also apply force 2426 against flange 2428 of cover 2402. Force 2426 may act to push flange 2428 against housing 2418. Connector 2406 may incorporate a tensioner mechanism that may adjust a magnitude of force 2424 and force 2426.

Similarly, that connector 2412 may apply force 2430 against cover 2402. Force 2430 may act to push retaining feature 128 into inlet 114 (see FIG. 1) of engine 2420. Connector 2412 may also apply force 2432 against flange 2428 of cover 2402. Force 2432 may act to push flange 2428 against housing 2418. Connector 2412 may incorporate a tensioner mechanism that may adjust a magnitude of force 2430 and force 2432.

Generation of force 2424 and force 2426, and/or force 2430 and force 2432 by secondary retention system 2100 may allow a reduction in a size requirement for a primary retaining feature such as without limitation retaining feature 128 of FIG. 1 and/or retaining feature 1006 of FIG. 10.

With secondary retention system 2400 present, retaining feature 128 of FIG. 1 and/or retaining feature 1006 of FIG. 10 may not need to be as long and/or extend as deeply into inlet 114 of FIG. 1 to provide a stable and secure fit for retaining feature 128 of FIG. 1 and/or retaining feature 1006 of FIG. 10. By allowing retaining feature 128 of FIG. 1 and/or retaining feature 1006 of FIG. 10 to not be as long, less material is needed constructing cover 2402 as compared to retaining feature 128 of FIG. 1 and/or retaining feature 1006 of FIG. 10 that do not include secondary retention system 2400.

Using less material may reduce at least a cost, a weight, an overall size, and a storage and/or transport space required for retaining feature 128 of FIG. 1 and/or retaining feature 1006 of FIG. 10, which may reduce a thickness, a density, a strength, and/or an amount of material needed for structure 2434, as compared to structure 124 of FIG. 1 and/or structure 1002 of FIG. 10 not using secondary retention system 2400. Using less material for structure 2434 and/or retaining feature 128 of FIG. 1 and/or retaining feature 1006 may reduce at least a cost, a weight, an overall size, and a storage and/or transport space required for cover 2402 as compared to cover 100 of FIG. 1 and/or cover 1000 of FIG. 10 without secondary retention system 2400. Therefore, by adding Secondary retention system 2400 to cover 2402, as compared to cover 100 of FIG. 1 and/or cover 1000 of FIG. 10 without secondary retention system 2400, a cost, time, material, and equipment required for manufacturing cover 2402 may be reduced as compared to those factors for cover 100 of FIG. 1 and/or cover 1000 of FIG. 10 not using secondary retention system 2400.

Similarly, secondary retention system 2400 may be added on to a cover with a flange and a sealing system, such as without limitation cover 1000 of FIG. 10, cover 1100 in FIG. 11 through FIG. 16.

Figure 25:
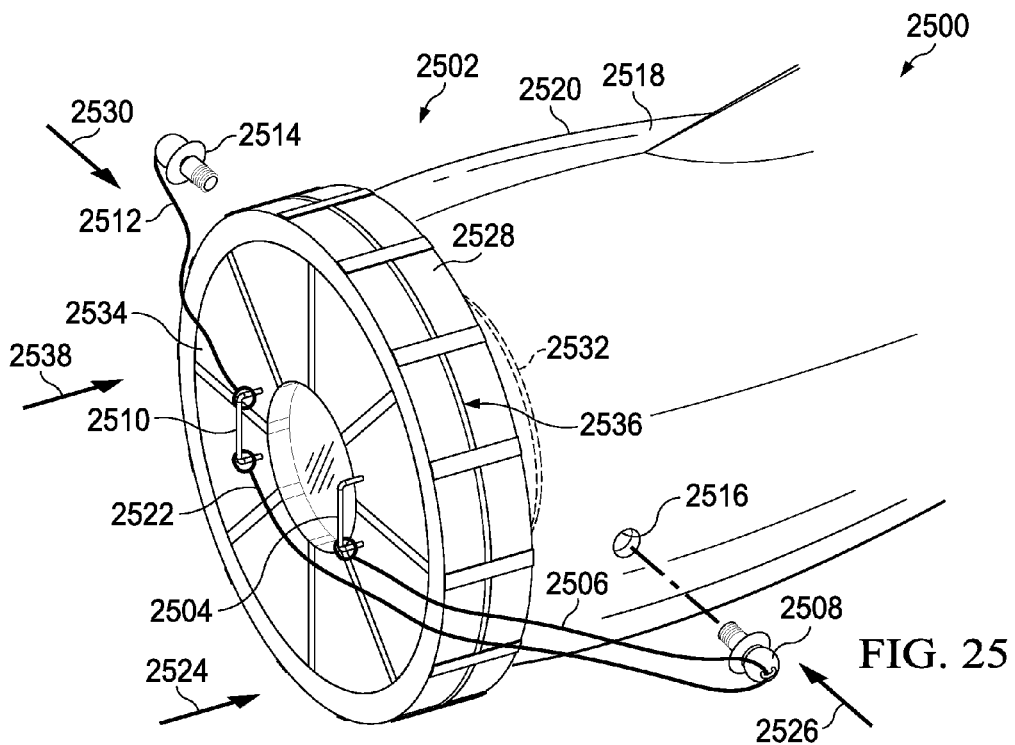
FIG. 25 is an illustration of a perspective view of a secondary retention system for a cover, including a sealing system, for an engine housing, depicted in accordance with an illustrative embodiment.

Turning now to FIG. 25, an illustration of a perspective view of a secondary retention system for a cover, including a sealing system, for an engine housing is depicted in accordance with an illustrative embodiment. Darkscrew 2508 may also be included in a secondary retention system 2500 for cover 2502 that includes flange 2528, which may be extended a greater length than flange 2528 of FIG. 22, and/or a seal such as without limitation flange 1104 of FIG. 11 and sealing member 1206 of FIG. 12, which may form sealing system 2536. Sealing system 2536 may be a non-limiting example of an illustrative embodiment of sealing system 1108 of FIG. 11.

Secondary retention system 2500 may include cover 2502, handle 2504, connector 2506, Darkscrew 2508, handle 2510, connector 2512, Darkscrew 2514, and receptacle 2516 and a receptacle (not shown) receiving Darkscrew 2514 in housing 2518 in engine 2520. The sizes of handle 2504, connector 2506, Darkscrew 2508, handle 2510, connector 2512, Darkscrew 2514, and receptacle 2516 are not presented in proper scale, but to present relative positioning of these features relative to each other and cover 2502 housing 2518 and engine 2520. In this illustrative example, cover 2502 is shown attached to end 700 in FIG. 7 of housing 2518. Without limitation cover 2502 may be a nonlimiting example of an illustrative embodiment of cover 100 in FIG. 1, cover 200 in FIG. 8, cover 1000 in FIG. 10, and/or cover 1100 in FIG. 11. Without limitation handle 2504 may be a nonlimiting example of an illustrative embodiment of one of number of handles 164 in FIG. 1, handle 238 in FIG. 2 or FIG. 8, and/or handle 1122 in FIG. 11 or FIG. 15. Without limitation housing 2518 may be a nonlimiting example of an illustrative embodiment of housing 108 in FIG. 1, housing 620 in FIG. 6 or FIG. 8, and/or housing 1504 in FIG. 15. Without limitation engine 2520 may be a nonlimiting example of an illustrative embodiment of engine 102 in FIG. 1, engine 608 in FIG. 6 or FIG. 8, and/or engine 1500 in FIG. 15.

Connector 2506 may connect Darkscrew 2508 to handle 2504 via any effective means. Connector 2506 may be made of material that is durable and resistant to corrosion and/or degradation in weather conditions that may exist for engine 2520 while not in operation. In other words, without limitation connector 2506 may be made of material that is durable and resistant to corrosion and/or degradation in weather conditions that may exist for engine 2520 in storage or on an aircraft that is parked.

Without limitation connector 2506 may be a fixed length, may be a bungee cord or similar elastic material that may have some flexibility of length, or may be an adjustable length. Connector 2506 may be long enough for Darkscrew 2508 to reach receptacle 2516 in housing 2518 while one end of connector 2506 remains connected to handle 2504.

Connector 2506 may connect to handle 2504 via any suitable means that may be permanent or a detachable connection. Likewise, connector 2506 may connect to Darkscrew 2508 via any suitable means that may be permanent or detachable. A connection of connector 2506 to handle 2504 and a connection of connector 2506 to Darkscrew 2508 may each be sufficiently strong to withstand any dislodge forces, which may act upon secondary retention system 2500 or any member thereof, without resulting in a separation of connector 2506 from either Darkscrew 2508 or from handle 2504.

Darkscrew 2508 may connect to receptacle 2516 in housing 2518. Darkscrew 2514 may connect to receptacle 2516. Darkscrew 2514 and connector 2512, and their association with each other, may be identical to Darkscrew 2508 and connector 2506 respectively, and their association with each other. Connector 2506 may connect to either handle 2504 or handle 2510. When connector 2506 connects to handle 2510 (as represented by 2522), connector 2506 may be longer than connector 2512. When connector 2506 connects to handle 2510, connector 2506 may have a connection to handle 2510 that is distinct from connector 2512, or connector 2506 and connector 25061 may share a connection to handle 2510.

Connector 2506 and connector 2512 may each be short enough so that when Darkscrew 2508 connects to receptacle 2516, and Darkscrew 2514 connects to another receptacle, secondary retention system 2500 may act to retain cover 2502, retaining feature 1006, flange 1004, and/or sealing system 1008, at least as shown in FIG. 10, from a position, relative to engine 102 housing 108, that performs the intended use and/or function of the respective cover 2502, retaining feature 1006, flange 1004, and/or sealing system 1008 connected to housing 108.

Receptacle 2516 and receptacle 2516 may be preexisting receptacles in housing 2518. Receptacle 2516 and receptacle 2516 may each be positioned, sized, and made of a shape and a material designed for attaching a tool to housing 2518 suitable for hoisting and/or transporting housing 2518 and/or cowl structure 122 of FIG. 1 or cowl structure 712 of FIG. 7 and FIG. 9 of housing 2518 of a particular engine. In other words, receptacle 2516 and receptacle 2516 may each be known to an engine cowl manufacturer as hoist receptacles. An engine cowl may have more hoist receptacles than receptacle 2516 and receptacle 2516. Thus, receptacle 2516 and receptacle 2516 may be identical to each other or unique from each other at determined by a manufacturer of engine 2520. Likewise, additional receptacles may also be present in housing 2518. Spacing of receptacles in housing 2518 may be as designed by the manufacturer of engine 2520. Receptacle 2516 and the receptacle for receiving Darkscrew 2514 may be located at approximately a 3 O'clock and a 9 O'clock position on housing 2518.

The connection between connector 2506 and Darkscrew 2508 and between connector 2512 and Darkscrew 2514 may each be formed such that when a particular Darkscrew must be rotated to be connected to its respective receptacle, that the connection between the particular Darkscrew and its respective connector is such that the particular Darkscrew may be rotated without being hindered by an attached connector.

One of ordinary skill in the art may recognize that when Darkscrew 2508 may be secured into receptacle 2516 and Darkscrew 2514 may be secured into receptacle 2516, that connector 2506 may apply force 2524 against cover 2502. Force 2524 may act to push retaining feature 128 into inlet 114 (see FIG. 1) of engine 2520. Connector 2506 may also apply force 2526 against flange 2528 of cover 2502. Force 2526 may act to push flange 2528 against housing 2518. Connector 2506 may incorporate a tensioner mechanism that may adjust a magnitude of force 2524 and force 2526.

Similarly, connector 2512 may apply force 2538 against cover 2502. Force 2538 may act to push structure 2534 into inlet 114 (see FIG. 1) of engine 2520 housing 2312. Connector 2512 may also apply force 2530 against flange 2528 of cover 2502. Force 2530 may act to push flange against housing 2518. Connector 2512 may incorporate a tensioner mechanism that may adjust a magnitude of force 2538 and force 2530.

Similar to the description above for cover 2402, generation of force 2524 and force 2538, and/or force 2526 and force 2530 by secondary retention system 2500 may allow a reduction in a size requirement for a primary retaining feature such as without limitation retaining feature 2532 and/or retaining feature 1006 of FIG. 10. With secondary retention system 2500 present, retaining feature 2532 and/or retaining feature 1006 of FIG. 10 may not need to be as long and/or extend as deeply into inlet 114 of FIG. 1 to provide a stable and secure fit for retaining feature 1006 of FIG. 10. By allowing retaining feature 2532 and/or retaining feature 1006 of FIG. 10 to not be as long, less material is needed constructing cover 2502 as compared to retaining feature 2532 and/or retaining feature 1006 of FIG. 10 that do not include secondary retention system 2500.

Using less material for retaining feature 2532 and/or retaining feature 1006 of FIG. 10 may reduce at least a cost, a weight, an overall size, and a storage and/or transport space required for retaining feature 2532 and/or retaining feature 1006 of FIG. 10, which may reduce a thickness, a density, a strength, and/or an amount of material needed for structure 2534, as compared to structure 124 of FIG. 1 and/or structure 1002 of FIG. 10 not using secondary retention system 2500.

Additionally, reducing a size of retaining feature 2532, retaining feature 1006 of FIG. 10, and/or retaining feature 1106 of FIG. 11 and/or FIG. 12, may reduce a space available for holding structure 1210 inside retaining feature 1106 as shown in FIG. 12. Eliminating holding structure 1210 may also reduce a weight, size, complexity, and strength requirement of retaining feature 2532 for cover 2502 and/or retaining feature 1006 of FIG. 10, and/or retaining feature 1106 of FIG. 11 and/or FIG. 12. Desiccant 1212 as shown in FIG. 12 may be supported by a hammock or a bladder feature as shown further in FIG. 26 and FIG. 27.

Using less material for structure 2534, and/or without limitation retaining feature 1006 of FIG. 10, and/or retaining feature 1106 of FIG. 11 and/or FIG. 12 may reduce at least a cost, a weight, an overall size, and a storage and/or transport space required for cover 2502 as compared to cover 100 of FIG. 1 without limitation retaining feature 1006 and/or retaining feature 1106 of FIG. 11 and/or FIG. 12 without secondary retention system 2500. Therefore, by adding Secondary retention system 2500 to cover 2502, as compared to, without limitation, cover 100 of FIG. 1, without limitation retaining feature 1006 of FIG. 10, and/or retaining feature 1106 of FIG. 11 and/or FIG. 12 without secondary retention system 2500, a cost, time, material, and equipment required for manufacturing cover 2502 may be reduced as compared to those factors for cover 100 of FIG. 1, and/or, without limitation, retaining feature 1006 of FIG. 10, and/or retaining feature 1106 of FIG. 11 and/or FIG. 12 without secondary retention system 2500.

Figure 26:
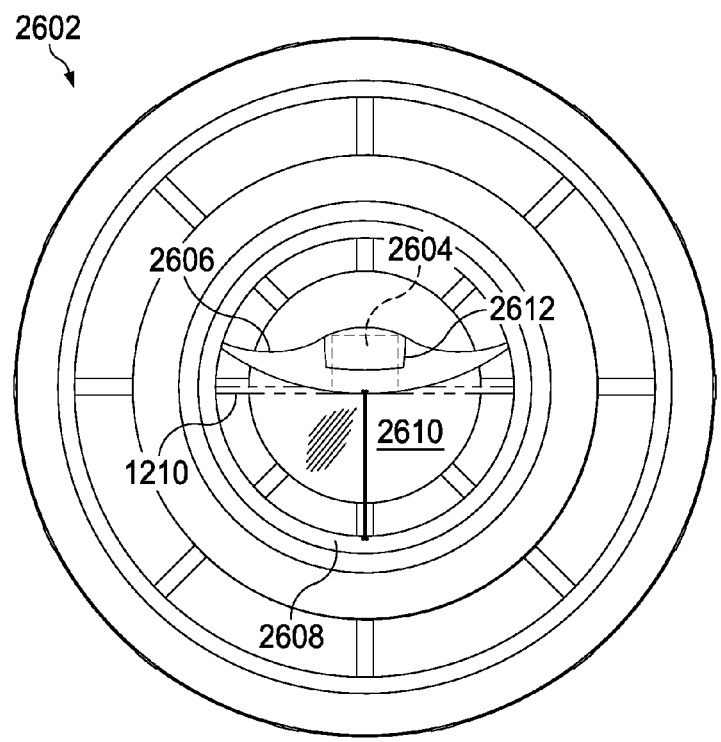
FIG. 26 is an illustration of a rear elevation, looking from inside an inlet toward a cover engaged with the inlet, of the cover supporting a desiccant in a hammock in the interior of a retaining feature the cover, depicted in accordance with an illustrative embodiment.

Turning now to FIG. 26, an illustration of a rear elevation, looking from inside an inlet toward a cover engaged with the inlet, of the cover supporting a desiccant in a hammock in the interior of a retaining feature the cover, is depicted in accordance with an illustrative embodiment. Cover 2602 may be a nonlimiting example of cover 1000 of FIG. 10, and/or cover 1100 as shown in FIG. 14, in accordance with an illustrative embodiment. Desiccant 2604 may be a nonlimiting example of desiccant 1030 of FIG. 10, and/or desiccant 1212 of FIG. 14, in accordance with an illustrative embodiment. A dashed line being used to show holding structure 1210 indicates that holding structure 1210 is no longer present in the embodiment illustrated by cover 2602, as holding structure 1210 was present in cover 1100 of FIG. 14.

Hammock 2606 may replace holding structure 1210 in cover 2602. Hammock 2606 may be a nonlimiting example of a non-rigid version of holding structure 1028 of FIG. 10, in accordance with an illustrative embodiment. Hammock 2606 may be sized and formed as needed to accommodate desiccant 2604, and allow sufficient flow, of air inside an inlet occupied by cover 2602, to desiccant 2604 so as not to hinder moisture reduction capabilities of desiccant 2604.

Hammock 2606 may be positioned and secured inside retaining feature 2608, such that desiccant 2604 may be viewable through window 2610 in cover 2602. Window 2610 in cover 2602, without limitation, may be a nonlimiting example of window 1024 and structure 1002 of FIG. 10, and/or window 1120 in FIG. 11 through FIG. 16.

Hammock 2606 may connect to window 2610. Hammock 2606 may be formed of a mesh and/or a clear material. Hammock 2606 may have opening 2612 to accept or remove desiccant 2604. Opening 2612 may have a zipper, a Velcro seal, or any other type a seal as may allow access to desiccant 2604 but sufficiently retain desiccant 2604 in Hammock 2606 during use, storage, and/or transport of cover 2602.

Figure 27:
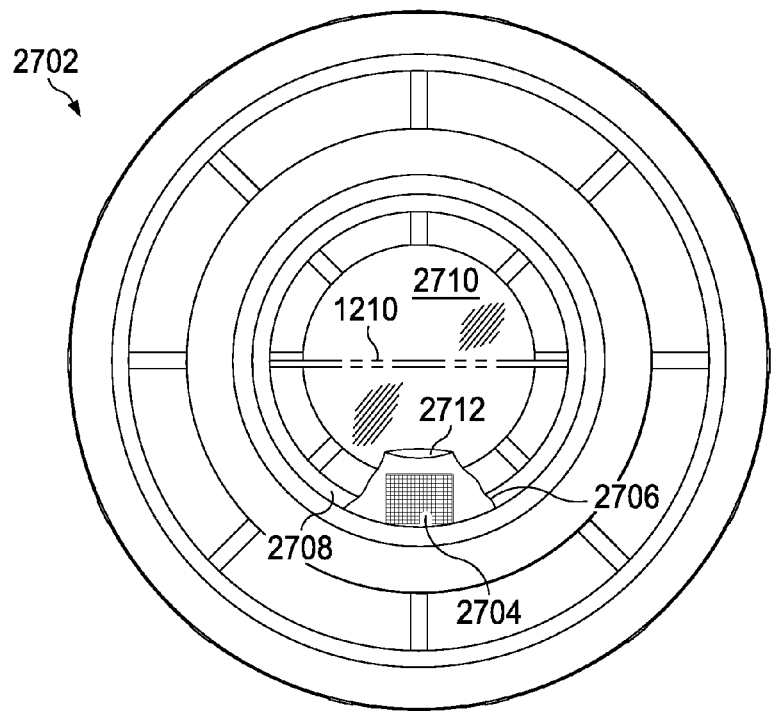
FIG. 27 is an illustration of an elevation, looking from inside an inlet toward a cover engaged with the inlet, of an interior of the cover supporting a desiccant in a bladder, depicted in accordance with an illustrative embodiment.

Turning now to FIG. 27, an illustration of an elevation, looking from inside an inlet toward a cover engaged with the inlet, of an interior of the cover supporting a desiccant in a bladder, is depicted in accordance with an illustrative embodiment. FIG. 27 differs from FIG. 26 in that instead of desiccant 2604 being held by hammock 2606 inside cover 2702, desiccant 2704 may be retained within a bladder 2706 in retaining feature 2708. Bladder 2706 may be a nonlimiting example of a non-rigid version of holding structure 1028 of FIG. 10, in accordance with an illustrative embodiment. Bladder 2706 may be located in any manner that may secure desiccant 2704 within retaining feature 2708 so as to allow sufficient flow, of air inside an inlet occupied by cover 2702, and not to hinder moisture reduction capabilities of desiccant 2704. Desiccant 2704 may be a nonlimiting example of desiccant 1030 of FIG. 10 and/or desiccant 2604 of FIG. 26.

Thus, bladder 2706 may be made of an air permeable material that allows visibility of desiccant condition and an indicator on desiccant 2704 through window 2710 from outside of cover 2702. Accordingly, bladder 2706 may be located as shown in FIG. 27, or in any other portion of retaining feature 2608 where bladder 2706 may properly function and be viewed through window 2610. Bladder 2706 may connect to window 2610.

Bladder 2706 may be formed of a mesh and/or a clear material. Bladder 2706 may have opening 2712 to accept or remove desiccant 2704. Opening 2712 may have a zipper, a Velcro seal, or any other type a seal as may allow access to desiccant 2704 but sufficiently retain desiccant 2704 in bladder 2706 during use, storage, and/or transport of cover 2702.

Illustrative embodiments also recognize and take into account that an inlet cover may be required to allow for drainage of any moisture that may be within an engine cowl. An engine cowl structure, such as without limitation cowl structure 122 of FIG. 1, may be referred to as a cowling. An engine cowl structure may be required to meet regulations regarding inlet designs such as without limitation United States Code of Federal Regulations, Title 14, Part 25.1193 for Cowling and nacelle skin, and/or Part 25.1187 for Drainage and ventilation of fire zones. Therefore, the illustrative embodiments recognize and take into account that an engine cowl may be required to have drain provisions. Accordingly, an engine cowl cover may need to be designed such that the engine cowl cover does not conceal or cover any drain provisions of the engine cowl.

Figure 28:
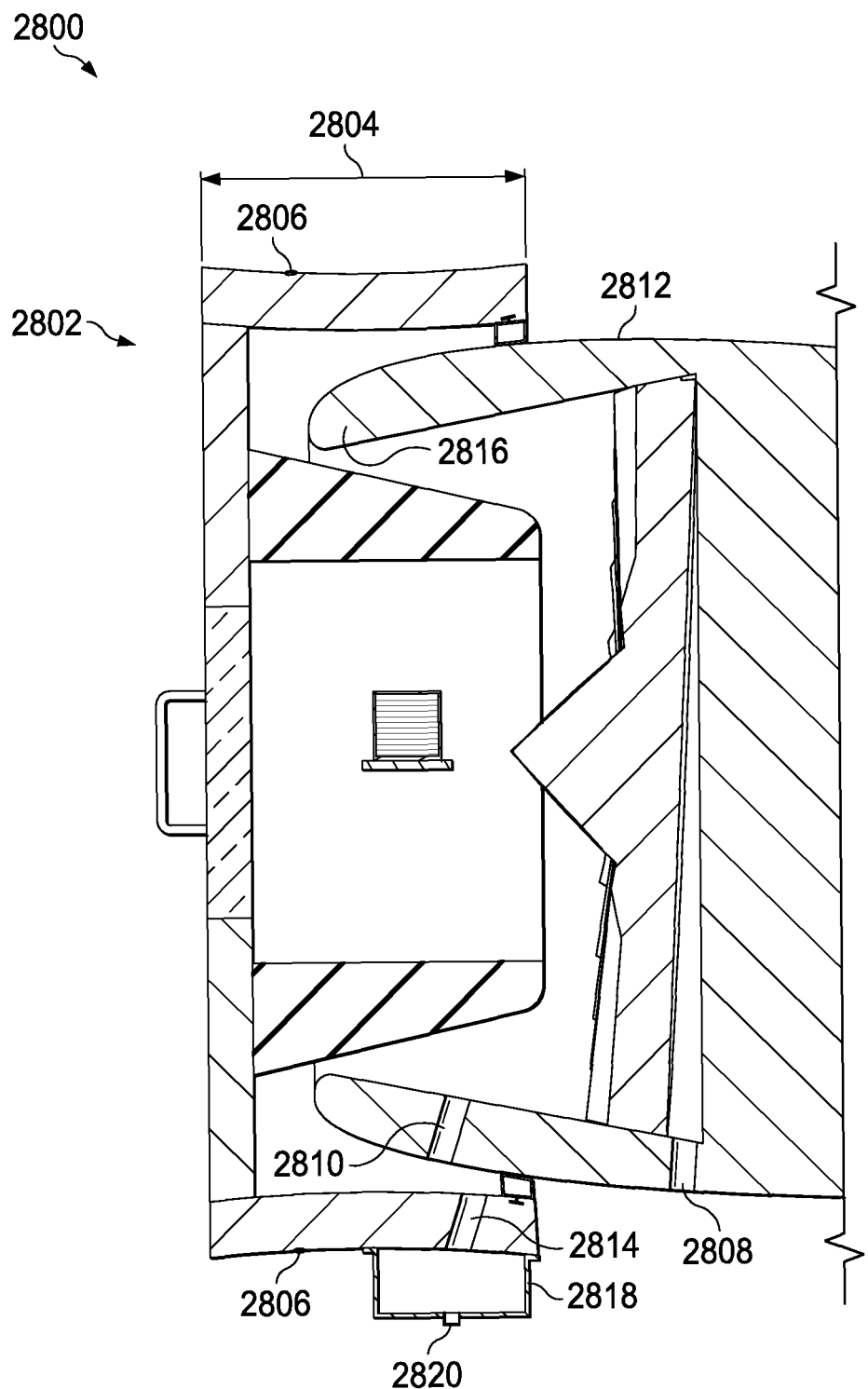
FIG. 28 is an illustration of a cross sectional side view of a cover with a drain system engaged in an engine housing, depicted in accordance with an illustrative embodiment.

Turning now to FIG. 28, an illustration of a cross sectional side view of a cover with a drain system engaged in an engine housing is depicted in accordance with an illustrative embodiment. Drain system 2800 of cover 2802 may simply consist of length 2804 of flange 2806 in cover 2802 being short enough that flange 2806 does not, without limitation: cover, obscure, block, impede, and/or hinder any drainage feature, such as without limitation drain hole 2808 and/or drain hole 2810, of cowl structure 2812. Cover 2802 may be a nonlimiting example of, without limitation, cover 1000 of FIG. 10, in accordance with an illustrative embodiment. Flange 2806 may be a nonlimiting example, without limitation of flange 1004 of FIG. 10, in accordance with an illustrative embodiment. Cowl structure 2812 may be a nonlimiting example of cowl structure 122 of FIG. 1, in accordance with an illustrative embodiment.

Cover 2802 may also have drain 2814. Drain 2814 may be located such that cover 2802 may comply with, and may allow cowl structure 2812 to comply with, any drainage requirements for an engine cowling. Without limitation, drain 2814 may be located at the lowest point of flange 2806 when cover 2802 may be installed in inlet 2816. Inlet 2816 may be a nonlimiting example of inlet 114 of FIG. 1, and/or inlet 1502 of FIG. 15 and FIG. 16.

As a nonlimiting example, drain 2814 may be located at a 6 O'clock position on cover 2802 as shown in FIG. 28. Thus, as a nonlimiting example, if cowl structure 2812 has drain hole 2810 located as indicated in FIG. 28, where drainage out of drain hole 2810 may fall onto flange 2806, drain 2814 may be located in flange 2806 such that a shape of flange 2806 around cover 2802 and a force of gravity will allow any drainage from cowl structure 2812 to reach drain 2814 when cover 2802 may be installed in inlet 2816. Drain 2814 may function such that drainage from cowl structure 2812 may be released through drain 2814 and exit cover 2802.

As regulations may allow or require, collector 2818 may be detachably connected below drain 2814. Alternatively, collector 2818 may be integrally connected to cover 2802 such that collector 2818 is not likely to separate from cover 2808 and become a loose foreign object that may enter an engine, such as without limitation engine 102 of FIG. 1.

Collector 2818 may be made from a material that may resist damage to or decay of collector 2818, cover 2802, and/or an engine, such as without limitation engine 102 of FIG. 1 that may be caused by, without limitation, weather, an environmental factor, and/or fluids forming drainage from cowl structure 2812. Collector 2818 may be made such that a volume and/or a color of a fluid in collector 2818 may be viewed without detaching collector 2818 from cover 2802. Collector 2818 may have an integral sight gauge that may indicate the volume of fluid within collector 2818. Collector 2818 may have drain 2820 that may allow drainage of fluid from collector 2818 without removing collector 2818 from cover 2802. Drain 2820 may be a quick drain feature. Without limitation, drain 2820 may be a tap drain, or a touch drain.

As used throughout this specification, "a number of items" means one or more items. For example, "a number of objects" means one or more objects.

The illustrations and different components depicted in the Figures above are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

Thus, an apparatus as described may support a method for providing a secondary retention system for a cover for an engine cowl and inlet.

Figure 29:
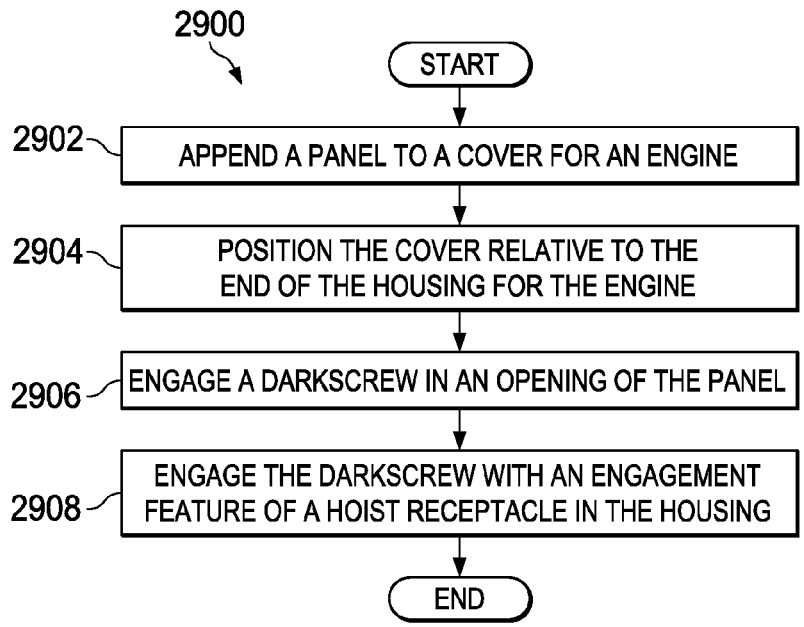
FIG. 29 is an illustration of a process for providing a secondary retention feature for a cover for an engine, depicted in the form of a flowchart in accordance with an illustrative embodiment.

Turning now to FIG. 29, an illustration of a process for providing a secondary retention feature for a cover for an engine, is depicted in the form of a flowchart in accordance with an illustrative embodiment. Process 2900 may begin by appending a panel to a cover for an engine (operation 2902). The cover of operation 2902 may include: a structure, a flange comprised of a deformable material extending from the structure around a circumference of the structure, and a retaining feature configured to extend from a middle portion of the structure such that the retaining feature and the flange form a channel configured to receive, such that in operation the channel receives, the end of the housing. The structure may include a shape selected to fully cover the opening of the housing for the engine.

Process 2900 may include positioning the cover relative to the end of the housing for the engine (operation 2904). Operation 2904 may include, before positioning the cover, placing a desiccant on a holding structure within a hollow portion of the retaining feature, such that an inner surface of the retaining feature forms the hollow portion in the retaining feature. An inner surface of the flange and an outer surface of the retaining feature may form the channel without contacting the inlet of the engine.

Figure 30:
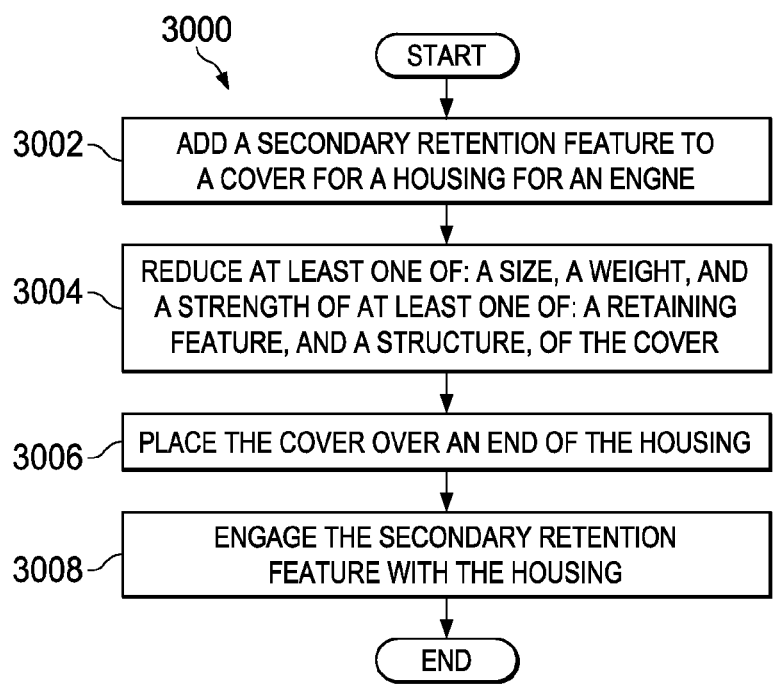
FIG. 30 is an illustration of a process for reducing at least one of: a cost, a time, a material, and equipment required for manufacturing a cover for covering an end of a housing for an engine, depicted in the form of a flowchart in accordance with an illustrative embodiment.

Process 2900 may include engaging a Darkscrew in an opening, the panel comprising the opening (operation 2906). The Darkscrew of operation 2906 may include a manual operation feature connected to a sealing feature connected to a capture feature connected to a contingent retraction feature connected to an engagement feature configured to connect, such that in operation the engagement feature connects, to the engine housing. The neck forming the capture feature of the Darkscrew may also serve as a shearing feature of the Darkscrew. Process 2900 may conclude by engaging the Darkscrew with an engagement feature of a hoist receptacle in a housing, the engine comprising the housing (operation 2908). Turning now to FIG. 30, an illustration of a process for reducing at least one of: a cost, a time, a material, and equipment required for manufacturing a cover for covering an end of a housing for an engine, is depicted in the form of a flowchart in accordance with an illustrative embodiment. Process 3000 may include providing a secondary retention system for the cover covering the end of the housing for the engine.

Process 3000 may begin by adding a secondary retention feature to a cover for a housing for an engine, for an engine (operation 3002). Operation 3002 may include: forming an opening in a panel for the cover, appending the panel to the cover, and capturing a Darkscrew within the opening. Process 3000 may include reducing at least one of: a size, a weight, and a strength of at least one of: a retaining feature, and a structure, of the cover (Operation 3004). Operation 3004 may include reducing at least one of: a cost, a time, a material, and equipment required for manufacturing the cover via reducing at least one of: a cost, a time, a material, and equipment required for manufacturing the retaining feature of the cover. Process 3000 may include placing the cover over an end of the housing (operation 3006). Process 3000 may include engaging the secondary retention feature with the housing (Operation 3008). Operation 3008 may include engaging the Darkscrew with a hoist receptacle in the housing.

Further, in illustrative examples above, some operations may be performed in a different order. For example, where steps of a process are indicated, unless specified otherwise, some steps may be reordered or omitted, or additional steps added to the claimed process.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacture that comprises:
    a retaining feature for a cover to an opening of a housing for an engine, the retaining feature configured to extend into an net of the engine through the opening of the housing, the retaining feature and a flange forming a channel configured to receive an end of the housing; and form an interference fit with a portion of an interior surface of the housing;
    the cover configured to substantially block all airflow into an net of the engine;
    a secondary retention system for a cover configured to cove an opening of a housing for an engine, such that the secondary retention system comprises a Darkscrew that comprises a manual operation feature connected to a sealing feature connected to a capture feature connected to a contingent retraction feature connected to an engagement feature configured to connect, such that in operation the engagement feature connects to the engine housing and the contingent retraction feature comprises a width greater than a width of the engagement feature.

2. The manufacture of claim 1, further comprising the engagement feature of the Darkscrew configured to conform to, such that in operation the engagement feature engages with, an engagement feature of a hoist receptacle in the engine housing.

3. The manufacture of claim 1, further comprising the manual operation feature being connected to a handle, the cover comprising the handle.

4. The manufacture of claim 1, further comprising the capture feature engaged by a panel connected to the cover.

5. The manufacture of claim 4, further comprising the panel being connected to the cover via being connected to a flange of the cover.

6. The manufacture of claim 5, further comprising:
    the flange comprising a deformable material configured to extend, such that in operation the flange extends, from around a circumference of a structure;
    the cover comprising the structure; and
    the capture feature of the Darkscrew also being a shearing feature of the Darkscrew.

7. The manufacture of claim 1, further comprising the cover comprising:
    the retaining feature configured to extend, such that in operation the retaining feature extends, as a hollowed cylinder into the inlet of the engine through the opening of the housing, from a middle portion of a structure; and
    the structure, the hollowed cylinder being sealed at one end by the structure, such that the retaining feature and a flange form a channel configured to receive, such that in operation the channel receives, an end of the housing and form an interference fit with a portion of an interior surface of the housing.

8. The manufacture of claim 7, further comprising a holding structure within a hollow portion of the retaining feature.

9. The manufacture of claim 1, further comprising a sealing system configured to block moisture, such that in operation the sealing system blocks moisture, from entering the opening of the housing into the inlet of the engine.

10. The manufacture of claim 9, further comprising the sealing system comprising a group of sealing members.

11. The manufacture of claim 1, further comprising the cover comprising a drain.

12. The manufacture of claim 11, further comprising the drain being located between a sealing system and the retaining feature of the cover.

13. A process of providing a secondary retention feature for a cover for an engine, the process comprising:
    providing a retaining feature for the cover, the retaining feature comprising a structure and the cover comprising a shape that substantially blocks all air flow into the engine;
    extending, from a middle portion of the structure, the retaining feature;
    extending, from around a circumference of the structure, a flange, the flange comprising a deformable material, and the retaining feature and the flange forming a channel;
    positioning the cover relative to an end of a housing of the engine via the channel receiving an end of the housing of the engine;
    engaging a Darkscrew in an opening of a panel extending from the flange; and
    engaging the Darkscrew with an engagement feature of a hoist receptacle in the housing, the engine comprising the housing.

14. The process of claim 13, further comprising placing a desiccant on a holding structure within a hollow portion of the retaining feature, such that an inner surface of the retaining feature forms the hollow portion in the retaining feature.

15. The process of claim 13, wherein an inner surface of the flange and an outer surface of the retaining feature form the channel without contacting an inlet of the engine.

16. The process of claim 13, wherein the structure comprising a shape selected to fully cover the opening of the housing for the engine.

17. The process of claim 13, further comprising the Darkscrew comprising a manual operation feature connected to a sealing feature connected to a capture feature connected to a contingent retraction feature connected to an engagement feature of the Darkscrew configured to connect, such that in operation the engagement feature of the Darkscrew connects, to the engine housing.

18. The process of claim 17, further comprising the capture feature of the Darkscrew also being a shearing feature of the Darkscrew.

19. A process of reducing, relative to a cover, not using a secondary retention system comprising a Darkscrew, for a housing for an engine, at least one of: a material, a weight, a size, and a cost, of the cover for the housing, the cover comprising a shape to substantially block all airflow through the engine; the process comprising:

providing the cover comprising: a retaining feature for the cover to an opening of the housing for an engine, the retaining feature configured to extend into an net of the engine through the opening of the housing, the retaining feature and a flange forming a channel configured to receive an end of the housing; and form an interference fit with a portion of an interior surface of the housing, and a secondary retention system comprising:

a panel connected to a flange of the cover; and the Darkscrew comprising a manual operation feature connected to a sealing feature connected to a capture feature connected to a contingent retraction feature connected to an engagement feature, comprising a width narrower than a width of the contingent retraction feature, and configured to connect, such that in operation the engagement feature connects, to the housing.

20. The process of claim 19, further comprising:

reducing at least one of: a cost, a time, a material, and equipment required for manufacturing the retaining feature of the cover;

positioning the cover relative to an end of the housing for the engine;

engaging the Darkscrew in an opening, the panel comprising the opening; and engaging the Darkscrew with an engagement feature of a hoist receptacle in the housing, the engine comprising the housing.

* * * * *

UNITED STATES PATENT AND TRADEMARK OFFICE
CERTIFICATE OF CORRECTION

PATENT NO. : 9,446,857 B2  
APPLICATION NO. : 14/564533  
DATED : September 20, 2016  
INVENTOR(S) : Sparks et al.

It is certified that error appears in the above-identified patent and that said Letters Patent is hereby corrected as shown below:

In the Claims

Column 37, Line 50, change "an net" to -- the inlet --
       Line 56, change "an net" to -- the inlet --
       Line 57, change "a cover" to -- the cover --
       Line 58, change "cove" to -- cover --
Column 38, Line 29-33, delete ", such that the retaining feature and a flange form a channel configured to receive, such that in operation the channel receives, an end of the housing and form an interference fit with a portion of an interior surface of the housing"
       Line 61, change "an end" to -- the end --
Column 40, Line 1, change "an net" to -- an inlet --
       Line 6, change "a secondary" to -- the secondary --

Signed and Sealed this
Fifth Day of June, 2018

Andrei Iancu
*Director of the United States Patent and Trademark Office*